(12) United States Patent
Takahashi et al.

(10) Patent No.: US 11,960,317 B2
(45) Date of Patent: Apr. 16, 2024

(54) DATA GENERATING DEVICE, LIGHT CONTROL DEVICE, DATA GENERATING METHOD, AND COMPUTER-READABLE RECORDING MEDIUM

(71) Applicant: HAMAMATSU PHOTONICS K.K., Hamamatsu (JP)

(72) Inventors: Koji Takahashi, Hamamatsu (JP); Koyo Watanabe, Hamamatsu (JP); Takashi Inoue, Hamamatsu (JP)

(73) Assignee: HAMAMATSU PHOTONICS K.K., Hamamatsu (JP)

( * ) Notice: Subject to any disclaimer, the term of this patent is extended or adjusted under 35 U.S.C. 154(b) by 1390 days.

(21) Appl. No.: 16/276,767

(22) Filed: Feb. 15, 2019

(65) Prior Publication Data

US 2019/0258206 A1 Aug. 22, 2019

(30) Foreign Application Priority Data

Feb. 19, 2018 (JP) ................................ 2018-026983
Dec. 27, 2018 (JP) ................................ 2018-245174

(51) Int. Cl.
*G03H 1/22* (2006.01)
*G01J 3/12* (2006.01)
(Continued)

(52) U.S. Cl.
CPC ............ *G06F 1/022* (2013.01); *G01J 5/0831* (2013.01); *G03H 1/16* (2013.01); *G03H 1/2294* (2013.01);
(Continued)

(58) Field of Classification Search
CPC ........ G06F 1/022; G06F 17/10; G01J 5/0831; G01J 2003/1282; G03H 1/16; G03H 1/2294; G03H 2223/23; G06G 7/19
See application file for complete search history.

(56) References Cited

U.S. PATENT DOCUMENTS

| 7,154,660 B2 * | 12/2006 | Reuter ............... G02B 26/0833 |
| | | 359/291 |
| 2002/0044328 A1 | 4/2002 | Silberberg et al. |
| 2018/0348549 A1 * | 12/2018 | Watanabe ................. G02F 1/13 |

FOREIGN PATENT DOCUMENTS

| JE | 2013-255128 A | 12/2013 |
| JP | 2000-207378 A | 7/2000 |

(Continued)

OTHER PUBLICATIONS

Weiner, A. M., et al. "Shaping of femtosecond pulses using phase-only filters designed by simulated annealing." JOSA A 10.5 (1993): 1112-1120. (Year: 1993).*

(Continued)

*Primary Examiner* — Bobbak Safaipour
*Assistant Examiner* — Jongbong Nah
(74) *Attorney, Agent, or Firm* — Faegre Drinker Biddle & Reath LLP

(57) ABSTRACT

An intensity spectrum designing unit of a data generating device includes an initial value setting unit that sets a plurality of objects of a first generation of an intensity spectrum function $A(\omega)$ and a phase spectrum function $\Psi(\omega)$, an evaluation value calculating unit that calculates an evaluation value for each of a plurality of objects of an n-th generation, an object selecting unit that selects two or more objects used for generating a plurality of objects of an (n+1)-th generation among objects of the n-th generation on the basis of superiority of the evaluation value, and a next-generation generating unit that generates a plurality of objects of the (n+1)-th generation on the basis of the selected two or more objects. The evaluation value calculating unit, the object selecting unit, and the next-generation generating unit repeat processes while 1 is added to n until a predetermined condition is satisfied.

16 Claims, 28 Drawing Sheets

(51) Int. Cl.
  *G01J 5/0831* (2022.01)
  *G03H 1/16* (2006.01)
  *G06F 1/02* (2006.01)
  *G06F 17/10* (2006.01)
  *G06G 7/19* (2006.01)

(52) U.S. Cl.
  CPC .............. *G06F 17/10* (2013.01); *G06G 7/19* (2013.01); *G01J 2003/1282* (2013.01); *G03H 2223/23* (2013.01)

(56) References Cited

FOREIGN PATENT DOCUMENTS

| JP | 2011-017674 A | 1/2011 |
|----|---------------|--------|
| JP | 2012-159546 A | 8/2012 |
| JP | 2014-153994 A | 8/2014 |
| JP | 2016-218141 A | 12/2016 |
| JP | 2016-218142 A | 12/2016 |

OTHER PUBLICATIONS

Hacker et al., "Iterative Fourier transform algorithm for phase-only pulse shaping", Optics Express, Aug. 13, 2001 vol. 9 No. 4, p. 191-p. 199.

Omenetto et al., "Adaptive Control Methods for Ultrafast Pulse Propagation in Optical Fibers", IEEE Journal of Selected Topics in Quantum Electronics, May 2002 vol. 8 No. 3, p. 690-p. 698.

Hiroaki Murata et al., "Genetic Algorithm with Improving Polulation and Corrupting Population to Avoid Evolutionary Stagnation, Application of Vehicle Routing Problem with Time Window", Journal of Information Processing,Transaction on Mathematical Modeling and its Applications, Oct. 2006 vol. 47 No. SIG14(TOM15), p. 1-p. 8.

\* cited by examiner

DATA GENERATING DEVICE, LIGHT CONTROL DEVICE, DATA GENERATING METHOD, AND COMPUTER-READABLE RECORDING MEDIUM

TECHNICAL FIELD

One aspect of the present invention relates to a data generating device, a light control device, a data generating method, and a computer-readable recording medium.

BACKGROUND

In Patent Document 1: Japanese Unexamined Patent Publication No. 2016-218141 and Patent Document 2: Japanese Unexamined Patent Publication No. 2016-218142, technologies for forming optical pulses by modulating at least one of a phase spectrum and an intensity spectrum using a spatial light modulator (SLM) are disclosed. In those documents, at least one of a phase spectrum and an intensity spectrum for acquiring a desired optical pulse waveform is calculated using a method with an improved iterative Fourier transform algorithm (IFTA).

For example, as a technology for controlling time waveforms of various kinds of light such as ultra-short pulse light, there is a technology in which a spectrum intensity and a spectrum phase (or only a spectrum intensity) of an optical pulse is modulated using an SLM. In such a technology, the SLM is caused to present a modulation pattern for applying a spectrum intensity (and a spectrum phase), which causes a time waveform of light to approach a desired waveform, to light. In such a case, in order to easily realize an arbitrary time waveform, it is preferable to acquire a spectrum intensity (and a spectrum phase) through calculation.

In order to acquire a spectrum intensity (and a spectrum phase) through calculation, for example, as illustrated in Patent Documents 1 and 2, an iterative Fourier method or a method with a modified iterative Fourier method is used. However, in the iterative Fourier method and the method with the modified iterative Fourier method, localized solutions occur at a relatively high ratio, and accordingly, a method capable of more accurately calculating an optimal solution is required.

SUMMARY

A data generating device according to one aspect of the present invention is a data generating device that generates data for controlling a spatial light modulator and includes an intensity spectrum designing unit configured to generate an intensity spectrum function $A(\omega)$ appropriate for a desired time-intensity waveform; and a data generating unit configured to generate the data on the basis of a phase spectrum function $\Psi(\omega)$ and the intensity spectrum function $A(\omega)$ generated by the intensity spectrum designing unit. The intensity spectrum designing unit includes: an initial value setting unit configured to set a plurality of objects of a first generation of the intensity spectrum function $A(\omega)$ and the phase spectrum function $\Psi(\omega)$; an evaluation value calculating unit configured to transform a plurality of first waveform functions of a frequency domain including a plurality of objects of an n-th generation (here, n is an integer equal to or greater than "1") and the phase spectrum function $\Psi(\omega)$ into a plurality of second waveform functions of a time domain each including a time-intensity waveform function and a time-phase waveform function and calculate an evaluation value representing a degree of difference between the time-intensity waveform function and the desired time-intensity waveform for each of the second waveform functions; an object selecting unit configured to select two or more objects used for generating a plurality of objects of an (n+1)-th generation among a plurality of objects of the n-th generation on the basis of superiority of the evaluation value; and a next-generation generating unit configured to generate a plurality of objects of the (n+1)-th generation on the basis of the two or more objects selected by the object selecting unit. In this data generating device, the evaluation value calculating unit, the object selecting unit, and the next-generation generating unit repeat processes while 1 is added to n until a predetermined condition is satisfied. The intensity spectrum designing unit generates an intensity spectrum function $A(\omega)$ appropriate for the desired time-intensity waveform from a plurality of objects of the n-th generation of a case in which the predetermined condition is satisfied.

A data generating method according to one aspect of the present invention is a method of generating data for controlling a spatial light modulator and includes: generating an intensity spectrum function $A(\omega)$ appropriate for a desired time-intensity waveform; and generating the data on the basis of a phase spectrum function $\Psi(\omega)$ and the intensity spectrum function $A(\omega)$. Generating of the intensity spectrum function includes: setting a plurality of objects of a first generation of the intensity spectrum function $A(\omega)$ and the phase spectrum function $\Psi(\omega)$; transforming a plurality of first waveform functions of a frequency domain including a plurality of objects of an n-th generation (here, n is an integer equal to or greater than "1") and the phase spectrum function $\Psi(\omega)$ into a plurality of second waveform functions of a time domain each including a time-intensity waveform function and a time-phase waveform function and calculating an evaluation value representing a degree of difference between the time-intensity waveform function and the desired time-intensity waveform for each of the second waveform functions; selecting two or more objects used for generating a plurality of objects of an (n+1)-th generation among a plurality of objects of the n-th generation on the basis of the evaluation value; and generating a plurality of objects of the (n+1)-th generation on the basis of the two or more objects. In this data generating method, calculating of the evaluation value, selecting of the objects, and generating of the objects are repeated while 1 is added to n until a predetermined condition is satisfied, and, in generating of the intensity spectrum function, an intensity spectrum function $A(\omega)$ that is appropriate for the desired time-intensity waveform is generated from a plurality of objects of the n-th generation of a case in which the predetermined condition is satisfied.

A computer-readable recording medium according to one aspect of the present invention is a non-transitory computer-readable storage medium including computer-readable instructions that, when executed by a computer, cause the computer to execute the data generating method described above.

A light control device according to one aspect of the present invention includes: a light source configured to output input light; a spectroscopic element configured to spectrally diffract the input light; a spatial light modulator configured to modulate an intensity spectrum of the input light after the spectral diffraction and output modulated light; and an optical system configured to condense the modulated light. The spatial light modulator modulates an intensity spectrum of the input light on the basis of the data generated by one of the data generating devices described above.

A data generating device according to another aspect of the present invention is a device generating data for controlling a spatial light modulator and includes: a spectrum designing unit configured to generate an intensity spectrum function $A(\omega)$ and a phase spectrum function $\Psi(\omega)$ for an optical pulse train including a plurality of optical pulses aligned with a time interval left therebetween; and a data generating unit configured to generate the data on the basis of the intensity spectrum function $A(\omega)$ and the phase spectrum function $\Psi(\omega)$ generated by the spectrum designing unit. The spectrum designing unit includes: an initial value setting unit configured to set a plurality of object pairs of a first generation relating to the intensity spectrum function $A(\omega)$ and the phase spectrum function $\Psi(\omega)$; an evaluation value calculating unit configured to calculate an evaluation value representing an amount of loss occurring due to intensity spectrum modulation based on a plurality of objects of an n-th generation (here, n is an integer that is equal to or greater than "1") of the intensity spectrum function $A(\omega)$ for each object pair; an object selecting unit configured to select two or more object pairs used for generating a plurality of object pairs of an (n+1)-th generation among a plurality of object pairs of the n-th generation on the basis of superiority of the evaluation value; and a next-generation generating unit configured to generate a plurality of object pairs of the (n+1)-th generation on the basis of the two or more object pairs selected by the object selecting unit. The evaluation value calculating unit, the object selecting unit, and the next-generation generating unit repeat processes while 1 is added to n until a predetermined condition is satisfied. The spectrum designing unit generates the intensity spectrum function $A(\omega)$ and the phase spectrum function $\Psi(\omega)$ for generating the optical pulse train from a plurality of object pairs of an n-th generation of a case in which a predetermined condition is satisfied.

A data generating method according to another aspect of the present invention is a method of generating data for controlling a spatial light modulator and includes: generating an intensity spectrum function $A(\omega)$ and a phase spectrum function $\Psi(\omega)$ appropriate for an optical pulse train including a plurality of optical pulses aligned with a time interval left therebetween; and generating the data on the basis of the intensity spectrum function $A(\omega)$ and the phase spectrum function $\Psi(\omega)$. Generating of the spectrum function includes: setting a plurality of object pairs of a first generation relating to the intensity spectrum function $A(\omega)$ and the phase spectrum function $\Psi(\omega)$; calculating an evaluation value representing an amount of loss occurring due to intensity spectrum modulation based on a plurality of objects of an n-th generation (here, n is an integer that is equal to or greater than "1") of the intensity spectrum function $A(\omega)$ for each object pair; selecting two or more object pairs used for generating a plurality of object pairs of an (n+1)-th generation among a plurality of object pairs of the n-th generation on the basis of superiority of the evaluation value; and generating a plurality of object pairs of the (n+1)-th generation on the basis of the two or more object pairs. In this data generating method, calculating of the evaluation value, setting of the object pairs, and generating of the object pairs are repeated while 1 is added to n until a predetermined condition is satisfied, and, in generating of the spectrum function, the intensity spectrum function $A(\omega)$ and the phase spectrum function $\Psi(\omega)$ that are appropriate for the optical pulse train are generated from a plurality of object pairs of an n-th generation of a case in which a predetermined condition is satisfied.

A computer-readable recording medium according to one aspect of the present invention is a non-transitory computer-readable storage medium including computer-readable instructions that, when executed by a computer, cause the computer to execute the data generating method described above.

A light control device according to another aspect of the present invention includes: a light source configured to output input light; a spectroscopic element configured to spectrally diffract the input light; a spatial light modulator configured to modulate the input light after the spectral diffraction and output modulated light; and an optical system configured to condense the modulated light. The spatial light modulator modulates the input light on the basis of the data generated by one of the data generating devices described above.

BRIEF DESCRIPTION OF THE DRAWINGS

FIG. 9 is a diagram conceptually illustrating a technique for calculating an intensity spectrum function $A_{IFTA}(\omega)$ in an initial object generating unit 25a;

FIGS. 22A, 22B, 22C and 22D are diagrams conceptually illustrating one example of a method of calculating M object pairs ($A_m(\omega)$, $\Psi_m(\omega)$) of a first generation (here, m is an integer that is equal to or larger than "1" and equal to or smaller than M) from M delta function groups in the initial object generating unit 25a;

DETAILED DESCRIPTION

Figure 1:
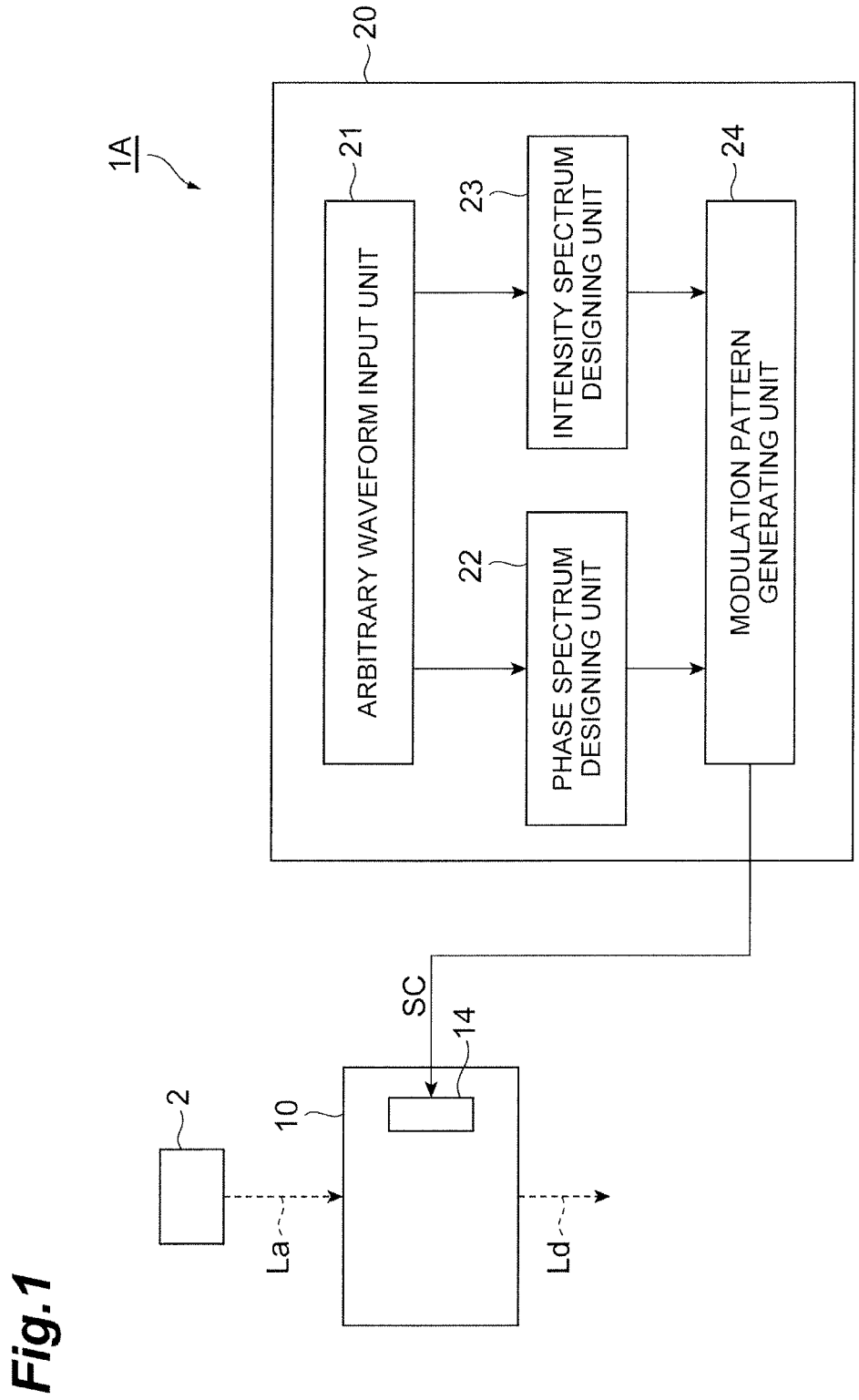
FIG. 1 is a diagram schematically illustrating the configuration of a light control device 1A according to a first embodiment of the present invention.

Hereinafter, a data generating device, a light control device, a data generating method, and a computer-readable recording medium according to embodiments of the present invention will be described in detail with reference to the attached drawings. In description of the drawings, the same reference numeral will be assigned to the same element, and duplicate description thereof will not be presented.

First Embodiment

Figure 2:
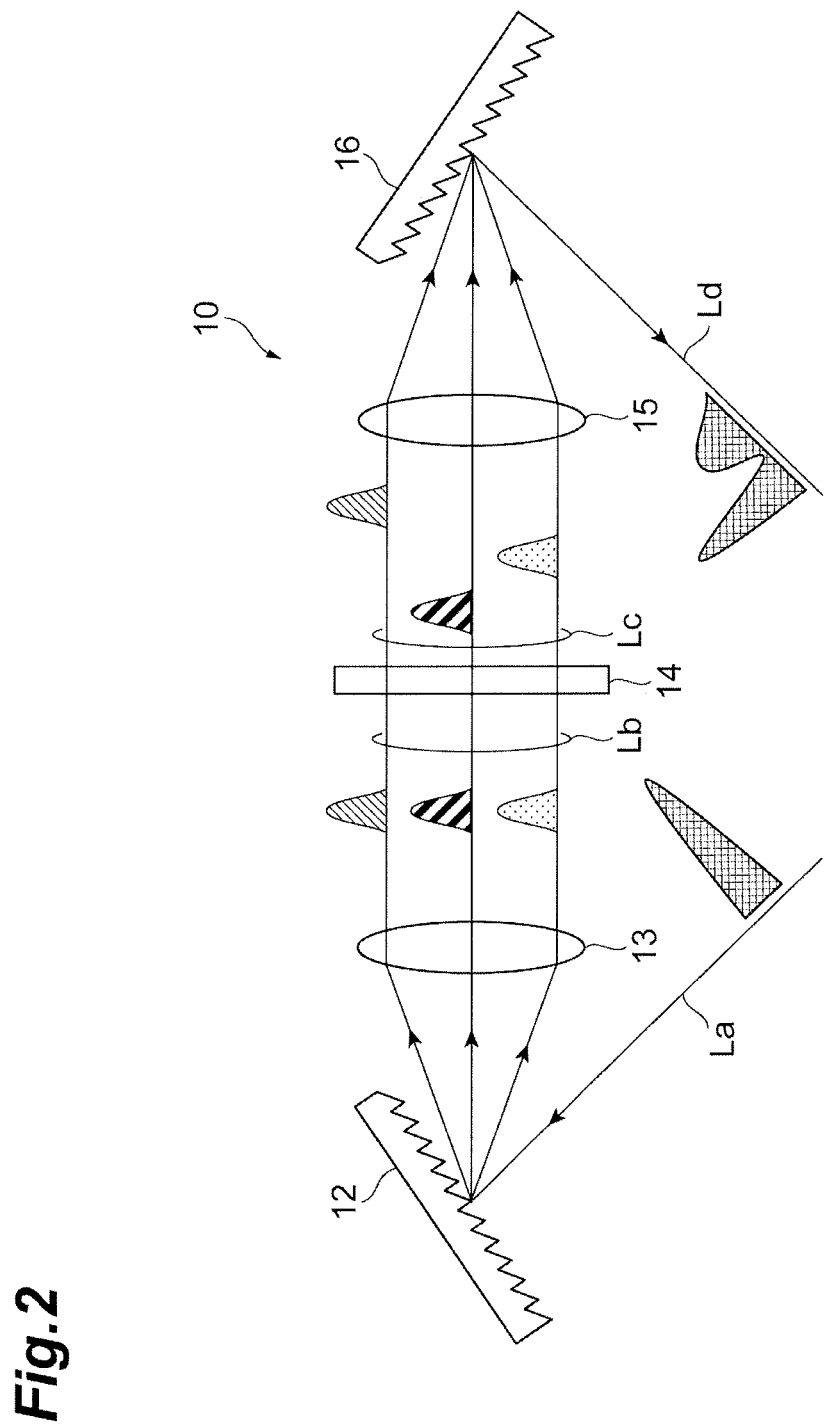
FIG. 2 is a diagram illustrating the configuration of an optical system 10 included in the light control device 1A.

FIG. 1 is a diagram schematically illustrating the configuration of a light control device 1A according to a first embodiment of the present invention. FIG. 2 is a diagram illustrating the configuration of an optical system 10 included in the light control device 1A. The light control device 1A according to this embodiment generates output light Ld having an arbitrary time-intensity waveform different from that of the input light La from the input light La. As illustrated in FIG. 1, the light control device 1A includes a light source 2, an optical system 10, and a modulation pattern calculating device (a data generating device) 20.

The light source 2 outputs input light La input to the optical system 10. The light source 2, for example, is a laser light source such as a solid-state laser light source or a fiber laser light source, and the input light La, for example, is coherent pulse light. The optical system 10 includes an SLM 14 and receives a control signal SC for controlling each pixel of the SLM 14 from the modulation pattern calculating device 20 in the SLM 14. The optical system 10 converts the input light La input from the light source 2 to output light Ld having an arbitrary time-intensity waveform. The modulation pattern is data for controlling the SLM 14 and is data acquired by outputting intensities of a complex amplitude distribution or intensities of a phase distribution to a file. The modulation pattern, for example, is a computer-generated hologram (CGH).

As illustrated in FIG. 2, the optical system 10 includes a diffraction grating 12, a lens 13, an SLM 14, a lens 15, and a diffraction grating 16. The diffraction grating 12 is a spectroscopic element according to this embodiment and is optically coupled with the light source 2. The SLM 14 is optically coupled with the diffraction grating 12 through the lens 13. The diffraction grating 12 spectrally diffracts the input light La for each wavelength component. In addition, instead of the diffraction grating 12 as a spectroscopic element, any other optical component such as a prism may be used. In addition, the spectroscopic element may be either a reflective type or a transmissive type. The input light La is obliquely incident on the diffraction grating 12 and is spectrally diffracted into a plurality of wavelength components. Light Lb including the plurality of wavelength components is condensed for each wavelength component by the lens 13 and is formed on a modulation plane of the SLM 14 as an image. The lens 13 may be a convex lens formed from a light transmissive member or may be a concave mirror having a concave light reflection face.

Figure 3:
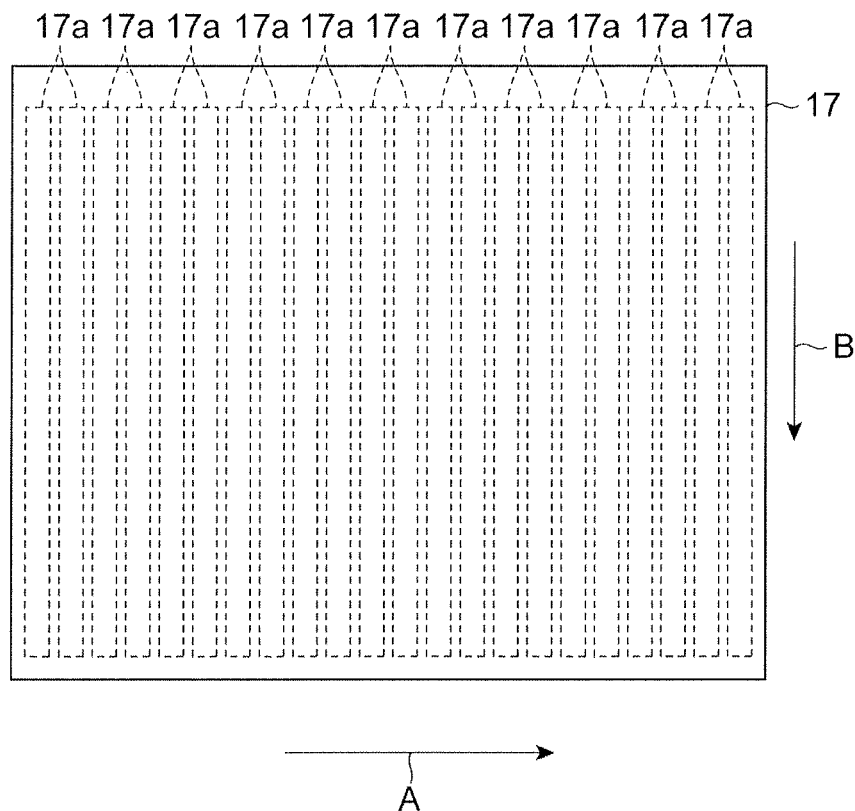
FIG. 3 is a diagram illustrating a modulation plane 17 of an SLM 14.

In order to generate output light Ld having an arbitrary time-intensity waveform different from that of the input light La, the SLM 14 simultaneously performs phase modulation and intensity modulation of the light Lb. The SLM 14 may perform only the intensity modulation. The SLM 14, for example, is a phase modulation type. In one embodiment, the SLM 14 is a liquid crystal on silicon (LCOS) type. Alternatively, the SLM 14 may be an intensity modulation-type SLM such as a digital micromirror device (DMD). In addition, the SLM 14 may be either a reflective type or a transmissive type. FIG. 3 is a diagram illustrating a modulation plane 17 of the SLM 14. As illustrated in FIG. 3, on the modulation plane 17, a plurality of modulation areas 17a are aligned in a certain direction A, and each modulation area 17a extends in a direction B intersecting with the direction A. The direction A is a spectral diffraction direction according to the diffraction grating 12. This modulation plane 17 works as a Fourier transformation plane, and each corresponding wavelength component after spectral diffraction is incident on one of the plurality of modulation areas 17a. The SLM 14 modulates a phase and an intensity of each incident wavelength component in each modulation area 17a, independently from other wavelength components. In addition, since the SLM 14 according to this embodiment is the phase modulation type, the intensity modulation is realized using a phase pattern (a phase image) presented on the modulation plane 17.

Wavelength components of the modulated light Lc modulated by the SLM 14 are gathered at one point on the diffraction grating 16 by the lens 15. At this time, the lens 15 functions as a condensing optical system that condenses the modulated light Lc. The lens 15 may be a convex lens formed using an optical transmissive member or may be a concave mirror having a concave light reflecting surface. In addition, the diffraction grating 16 functions as a wavelength multiplexing optical system and multiplexes wavelength components after modulation. In other words, in accordance with the lens 15 and the diffraction grating 16, a plurality of wavelength components of the modulated light Lc are condensed multiplexed and become output light Ld.

Figure 4A:
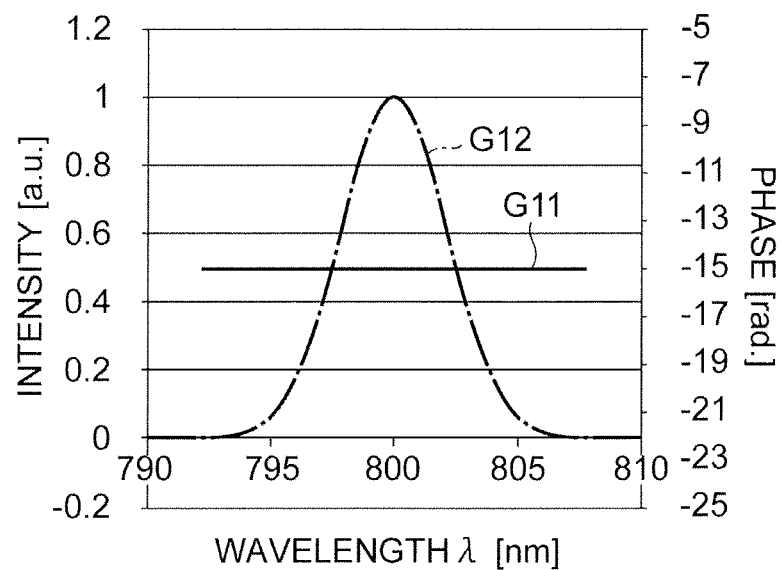
FIG. 4A is a graph illustrating a spectrum waveform (a spectrum phase G11 and a spectrum intensity G12) of input light La having a single-pulse shape as one example.
Figure 4B:
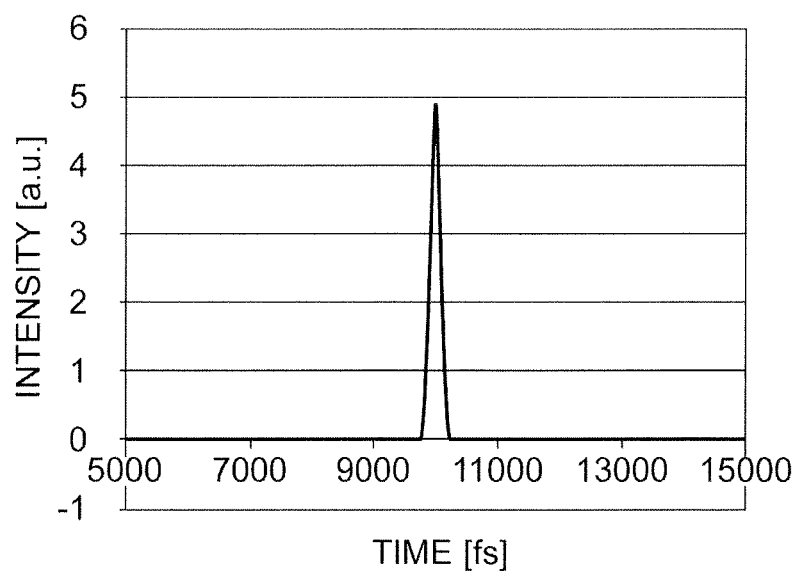
FIG. 4B is a graph illustrating a time-intensity waveform of the input light La having the single-pulse shape.
Figure 5A:
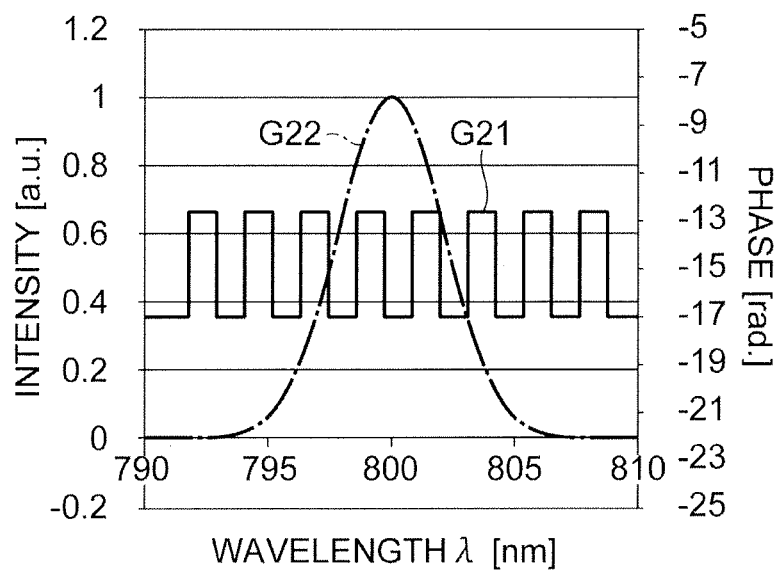
FIG. 5A is a graph illustrating a spectrum waveform (a spectrum phase G21 and a spectrum intensity G22) of output light Ld when phase spectrum modulation of a rectangular waveform is applied using the SLM 14 as one example.
Figure 5B:
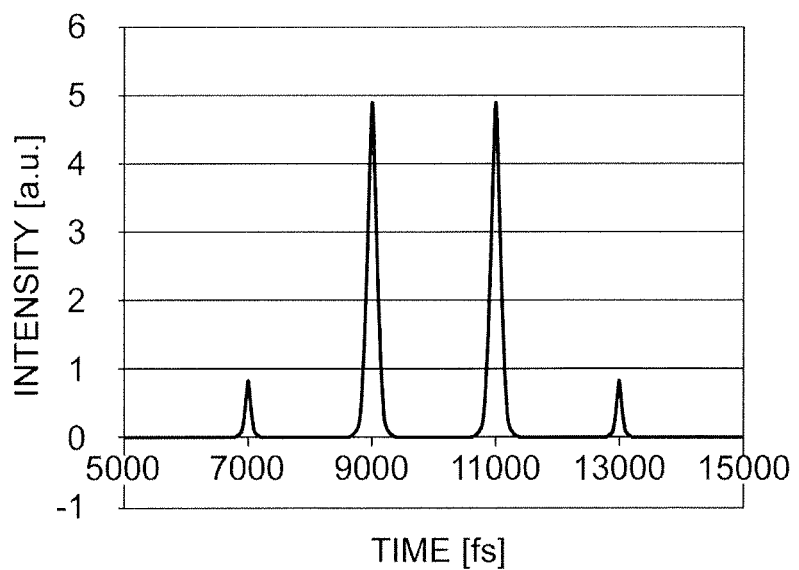
FIG. 5B is a graph illustrating a time-intensity waveform of the output light Ld.

A domain before the lens 15 (a spectrum domain) and a domain after the diffraction grating 16 (a time domain) are in a relation of a Fourier transform, and phase modulation and intensity modulation in the spectrum domain have influences on a time-intensity waveform in the time domain. Accordingly, the output light Ld has a desired time-intensity waveform different from that of the input light La in accordance with a modulation pattern of the SLM 14. Here, FIG. 4A illustrates a spectrum waveform (a spectrum phase G11 and a spectrum intensity G12) of input light La having a single pulse shape as one example, and FIG. 4B illustrates a time-intensity waveform of the input light La. In addition, FIG. 5A illustrates a spectrum waveform of output light Ld (a spectrum phase G21 and a spectrum intensity G22) when phase spectrum modulation having a rectangular waveform is given by the SLM 14 as one example, and FIG. 5B illustrates a time-intensity waveform of the output light Ld. In FIGS. 4A and 5A, a horizontal axis represents a wavelength (nm), a left vertical axis represents an intensity value (in arbitrary units) of the intensity spectrum, and a right vertical axis represents a phase value (rad) of the phase spectrum. In addition, in FIGS. 4B and 5B, a horizontal axis represents time (femtoseconds), and a vertical axis represents a light intensity (in arbitrary units). In this example, by applying a phase spectrum waveform having a rectangular waveform to the output light Ld, the single pulse of the input light La is converted into double pulses accompanying higher order light as the output light Ld. Here, the spectrums and the waveforms illustrated in FIGS. 4A, 4B, 5A, and 5B are examples, and the time-intensity waveform of the output light Ld can be shaped in various forms in accordance with various phase spectrums and intensity spectrums.

FIG. 1 will be referred to again. The modulation pattern calculating device 20, for example, is a computer including a processor such as a personal computer, a smart device such as a smartphone or a tablet terminal, or a cloud server. The modulation pattern calculating device 20 is electrically connected to the SLM 14, calculates a phase modulation pattern for causing the time-intensity waveform of the output light Ld to approach a desired waveform, and provides a control signal SC including the phase modulation pattern for the SLM 14. The modulation pattern calculating device 20 according to this embodiment causes the SLM 14 to present phase patterns including a phase pattern for phase modulation to apply a phase spectrum for acquiring a desired waveform to the output light Ld and a phase pattern for intensity modulation to apply an intensity spectrum for acquiring the desired waveform to the output light Ld. For this reason, the modulation pattern calculating device 20 includes an arbitrary waveform input unit 21, a phase spectrum designing unit 22, an intensity spectrum designing unit 23, and a modulation pattern generating unit (a data generating unit) 24. In other words, a processor of a computer disposed in the modulation pattern calculating device 20 realizes a function of the arbitrary waveform input unit 21, a function of the phase spectrum designing unit 22, a function of the intensity spectrum designing unit 23, and a function of the modulation pattern generating unit 24. Each function may be realized by the same processor or may be realized by a different processor.

Figure 6:
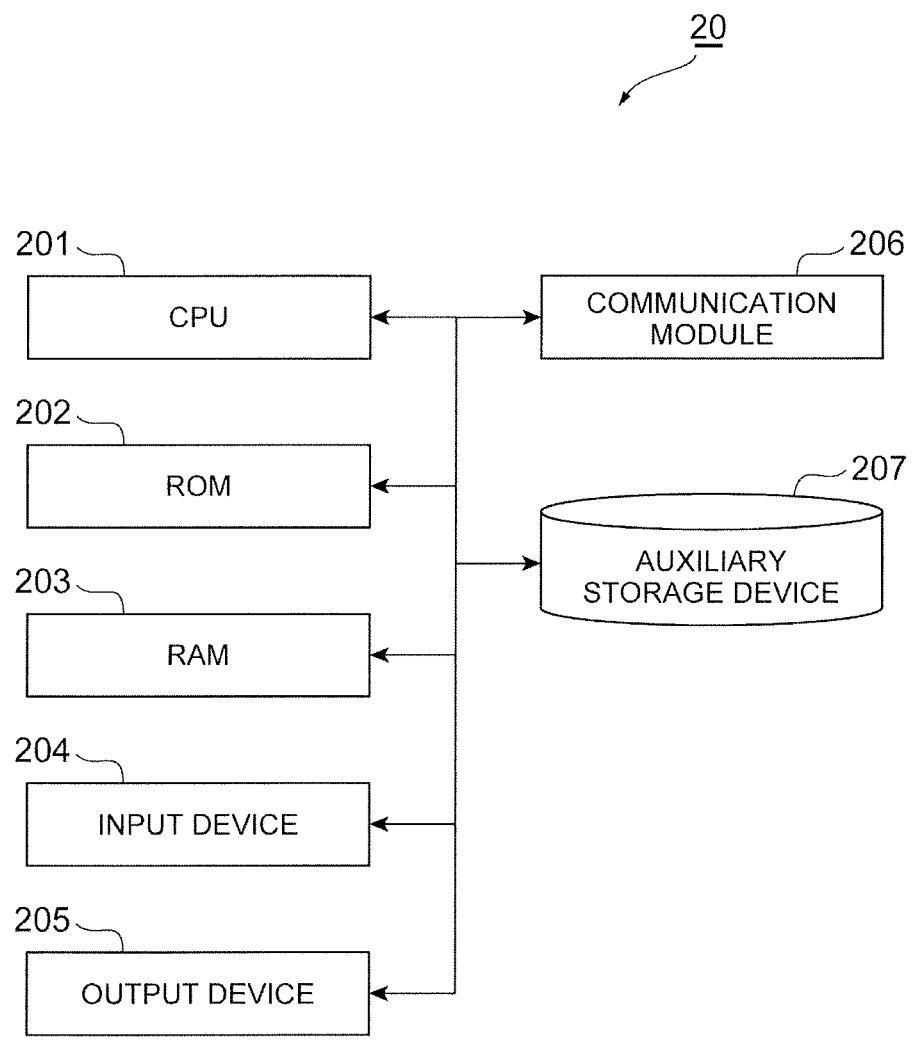
FIG. 6 is a diagram schematically illustrating an example of the hardware configuration of a modulation pattern calculating device 20.

FIG. 6 is a diagram schematically illustrating an example of the hardware configuration of the modulation pattern calculating device 20. As illustrated in FIG. 6, the modulation pattern calculating device 20, physically, may be configured as a general computer including a processor (CPU) 201, a main storage device such as a ROM 202 and a RAM 203, an input device 204 such as a keyboard, a mouse, and a touch screen, an output device 205 such as a display (including a touch screen), a communication module 206 such as a network card for transmitting/receiving data to/from other devices, an auxiliary storage device 207 such as a hard disk, and the like.

The processor 201 of the computer can realize each function described above (the arbitrary waveform input unit 21, the phase spectrum designing unit 22, the intensity spectrum designing unit 23, and the modulation pattern generating unit 24) in accordance with a modulation pattern calculating program (a data generating program). Accordingly, the modulation pattern calculating program causes the processor 201 of the computer to operate as the arbitrary waveform input unit 21, the phase spectrum designing unit 22, the intensity spectrum designing unit 23, and the modulation pattern generating unit 24 of the modulation pattern calculating device 20. The modulation pattern calculating program, for example, is stored in a storage device (a storage medium) disposed inside or outside the computer such as the auxiliary storage device 207. The storage device may be a non-transitory recording medium. Examples of the recording medium include a recording medium such as a flexible disk, a CD, or a DVD, a recording medium such as a ROM, a semiconductor memory, a cloud server, and the like.

The arbitrary waveform input unit 21 accepts an input of a desired time-intensity waveform from an operator. The operator inputs information relating to a desired time-intensity waveform (for example, a pulse width, the number of pulses, and the like) to the arbitrary waveform input unit 21. The information relating to a desired time-intensity waveform is given to the phase spectrum designing unit 22 and the intensity spectrum designing unit 23. The phase spectrum designing unit 22 calculates a phase spectrum of the output light Ld that is appropriate for the realization of the given desired time-intensity waveform. The intensity spectrum designing unit 23 calculates an intensity spectrum of the output light Ld that is appropriate for the realization of the given desired time-intensity waveform. The modulation pattern generating unit 24 calculates a phase modulation pattern (for example, a computer-generated hologram) for applying the phase spectrum acquired by the phase spectrum designing unit 22 and the intensity spectrum acquired by the intensity spectrum designing unit 23 to the output light Ld. Then, a control signal SC including the calculated phase modulation pattern is provided for the SLM 14, and the SLM 14 is controlled on the basis of the control signal SC.

Figure 7:
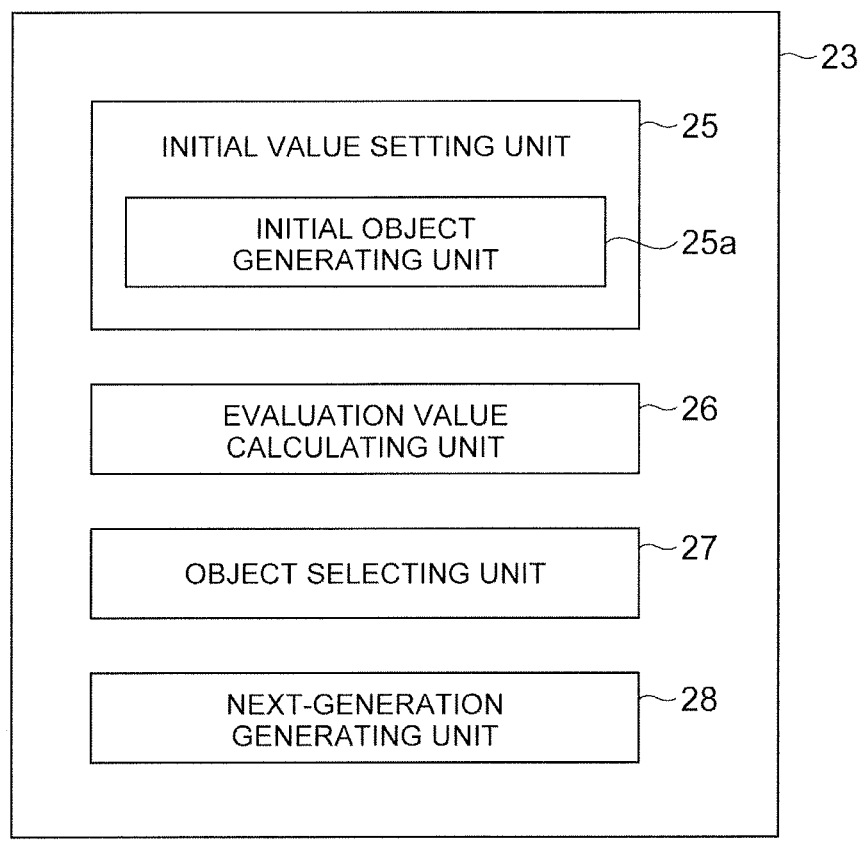
FIG. 7 is a block diagram illustrating the internal configuration of an intensity spectrum designing unit 23.
Figure 8:
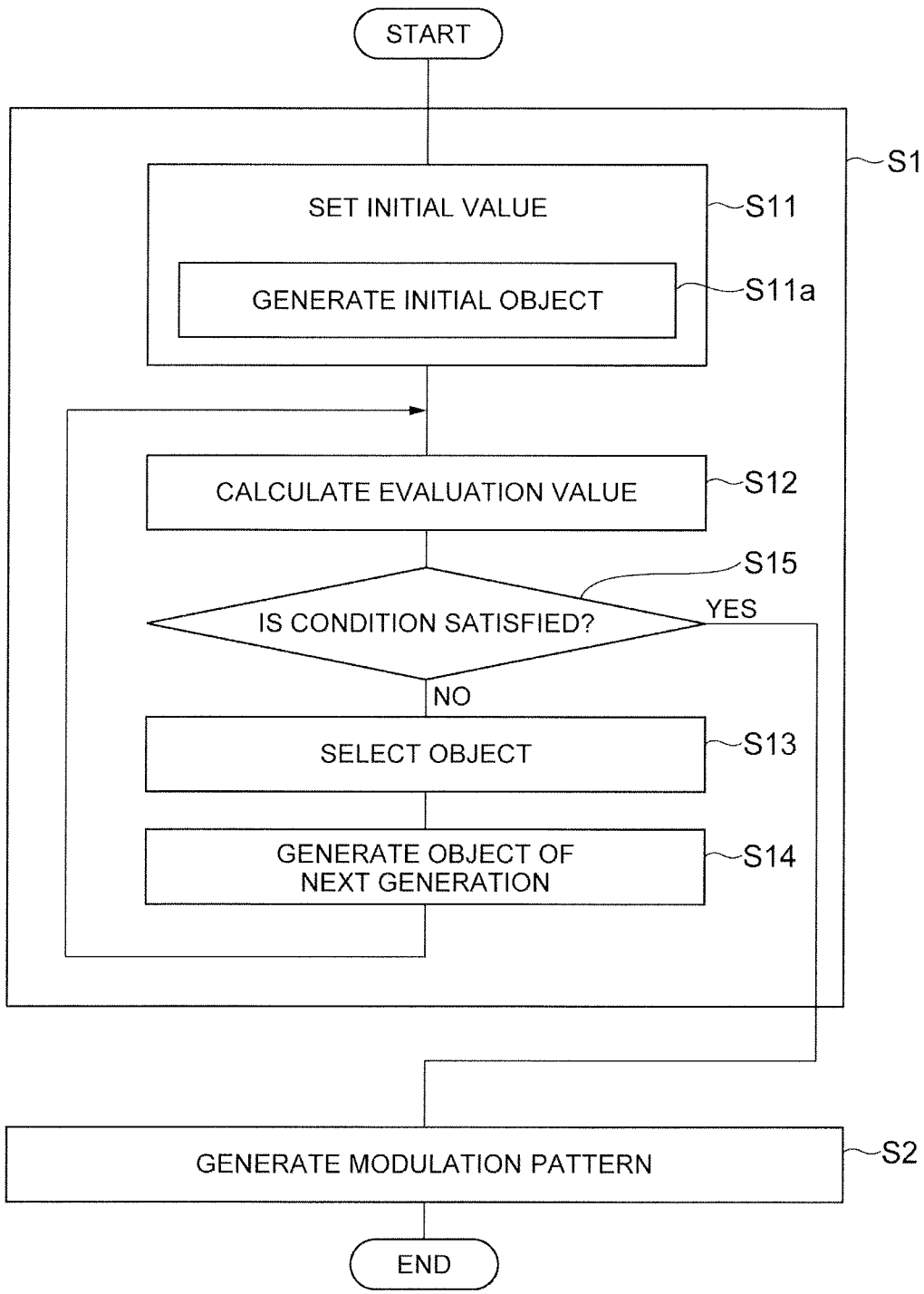
FIG. 8 is a flowchart illustrating an intensity spectrum designing method (a data generating method) using a modulation pattern calculating device 20.

FIG. 7 is a block diagram illustrating the internal configuration of the intensity spectrum designing unit 23. As illustrated in FIG. 7, the intensity spectrum designing unit 23 includes an initial value setting unit 25, an evaluation value calculating unit 26, an object selecting unit 27, and a next-generation generating unit 28. The initial value setting unit 25 includes an initial object generating unit 25a. FIG. 8 is a flowchart illustrating an intensity spectrum designing method (a data generating method) using the modulation pattern calculating device 20. Hereinafter, an operation of the modulation pattern calculating device 20 according to this embodiment, in other words, the intensity spectrum designing method (the data generating method), will be described with reference to FIGS. 7 and 8.

First, the intensity spectrum designing unit 23 generates an intensity spectrum function $A(\omega)$ that is appropriate for a desired time-intensity waveform input from the arbitrary waveform input unit 21 (an intensity spectrum function generating step S1). In more detail, the intensity-spectrum function generating step S1 is composed of an initial value setting step S11, an evaluation value calculating step S12, an object selecting step S13, and a next-generation generating step S14.

In the initial value setting step S11, the initial value setting unit 25 sets M (here, M is an integer equal to or greater than "2") objects (genetic information) $A_1(\omega)$ to $A_M(\omega)$ of a first generation relating to the intensity spectrum function $A(\omega)$ and a phase spectrum function $\Psi(\omega)$. The objects $A_1(\omega)$ to $A_M(\omega)$ and the phase spectrum function $\Psi(\omega)$ are functions of a frequency $\omega$. The phase spectrum function $\Psi(\omega)$ may be input by an operator or may be calculated by the phase spectrum designing unit 22. In accordance with this initial value setting step S11, M waveform functions (1) of the frequency domain including the objects $A_1(\omega)$ to $A_M(\omega)$ of the first generation of the intensity spectrum function $A(\omega)$ and the phase spectrum function $\Psi_0(\omega)$ are defined. These waveform functions (1) are first waveform functions according to this embodiment. Here, i is an imaginary unit.

$$\sqrt{A_1(\omega)}\exp\{i\Psi_0(\omega)\} \quad (1)$$

$$\sqrt{A_2(\omega)}\exp\{i\Psi_0(\omega)\}$$

$$\vdots$$

$$\sqrt{A_M(\omega)}\exp\{i\Psi_0(\omega)\}$$

Figure 9:
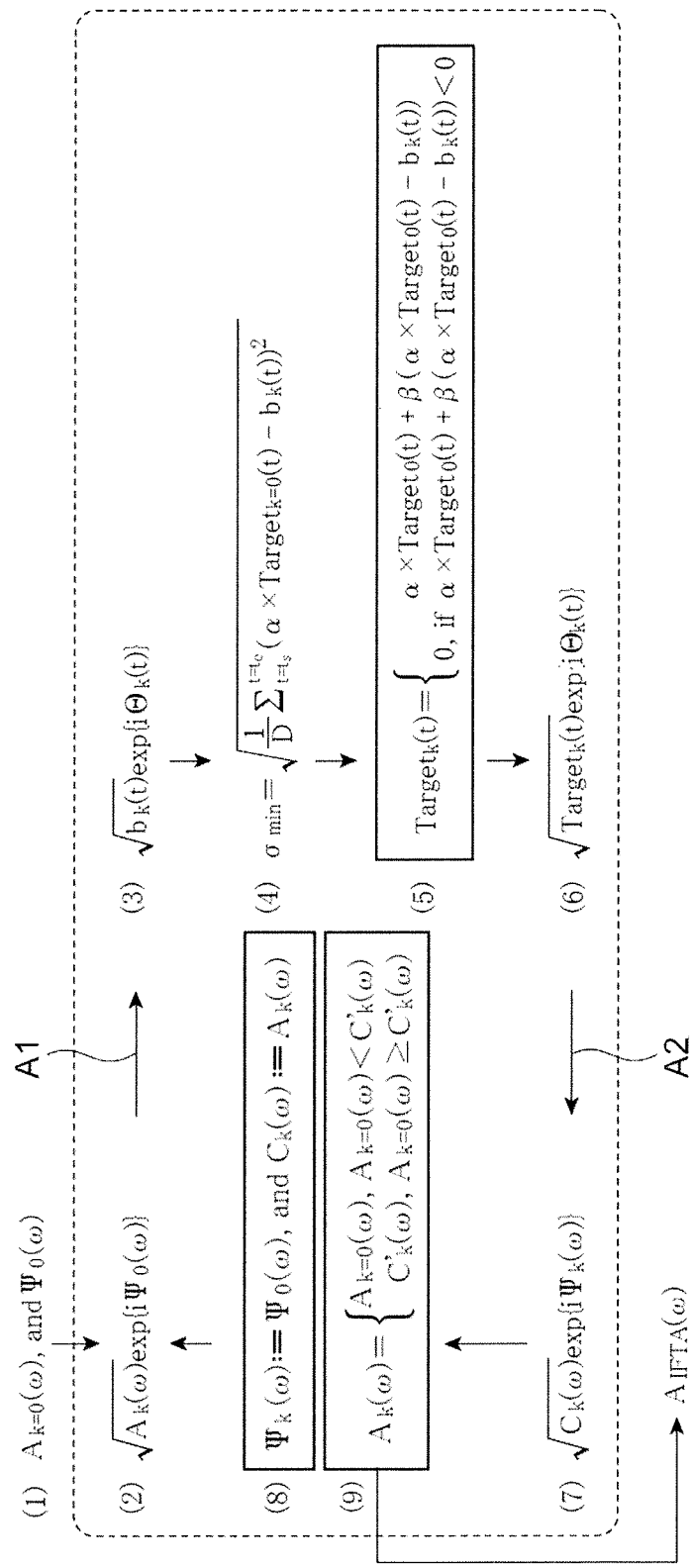

The initial value setting step S11 according to this embodiment includes an initial object generating step S11a. In the initial object generating step S11a, the initial object generating unit 25a generates an intensity spectrum function $A_{IFTA}(\omega)$ using an iterative Fourier method and generates objects $A_1(\omega)$ to $A_M(\omega)$ of the first generation by changing the intensity spectrum function $A_{IFTA}(\omega)$. FIG. 9 is a diagram conceptually illustrating a technique for calculating an intensity spectrum function $A_{IFTA}(\omega)$ in the initial object generating unit 25a. As illustrated in FIG. 9, first, the initial object generating unit 25a prepares an intensity spectrum function $A_{k=0}(\omega)$ and a phase spectrum function $\Psi_0(\omega)$ of the initial period (a processing number (1) in the drawing). As one example, the intensity spectrum function $A_{k=0}(\omega)$ and the phase spectrum function $\Psi_0(\omega)$ of the initial period are set on the basis of a spectrum intensity and a spectrum phase of input light La. Next, the initial object generating unit 25a prepares a waveform function (2) of the frequency domain including the intensity spectrum function $A_k(\omega)$ and the phase spectrum function $\Psi_0(\omega)$ (a processing number (2) in the drawing). This waveform function (2) is a third waveform function according to this embodiment.

$$\sqrt{A_k(\omega)}\exp\{i\Psi_0(\omega)\} \quad (2)$$

Here, a subscript k represents being after a k-th Fourier transform. Before an initial (first) Fourier transform process, the initial intensity spectrum function $A_{k=0}(\omega)$ described above is used as the intensity spectrum function $A_k(\omega)$. Here, i is an imaginary unit.

Subsequently, the initial object generating unit 25a performs a Fourier transform of the function (2) described above from the frequency domain to the time domain (an arrow A1 illustrated in the drawing). In this way, a waveform function (3) of the time domain including a time-intensity waveform function $b_k(t)$ and a time-phase function $\Theta_k(t)$ is acquired (a processing number (3) in the drawing).

$$\sqrt{b_k(t)}\exp\{i\Theta_k(t)\} \quad (3)$$

Subsequently, the initial object generating unit 25a acquires a coefficient $\alpha$ for which a difference between the waveform function $b_k(t)$ after the Fourier transform and a function ($\alpha \times \text{Target}_0(t)$) acquired by multiplying a function $\text{Target}_0(t)$ by the coefficient $\alpha$ is smaller than a difference between the waveform function $b_k(t)$ and the function $\text{Target}_0(t)$ (a process number (4) in the drawing). In one example, as illustrated in the following Equation (4), a coefficient $\alpha$ for which a standard deviation $\sigma$ of $\alpha \times \text{Target}_0(t)$ with respect to the waveform function $b_k(t)$ after the Fourier transform is a minimum ($\sigma_{min}$) is derived through exploration. In addition, in Equation (4), D represents the number of data points, and $t_s$ and $t_e$ respectively represent a start point and an end point on a time axis.

$$\sigma_{min} = \sqrt{\frac{1}{D}\sum_{t=t_s}^{t=t_e}(\alpha \times \text{Target}_{k=0}(t) - b_k(t))^2} \quad (4)$$

Subsequently, the initial object generating unit 25a performs a substitution based on a desired waveform (a first substitution) for the time-intensity waveform function $b_k(t)$ included in the function (3) after the Fourier transform. At this time, the initial object generating unit 25a performs the substitution using a function ($\alpha \times \text{Target}_0(t)$) acquired by multiplying the function $\text{Target}_0(t)$ representing a desired waveform by the coefficient $\alpha$. In one example, the substitution with $\text{Target}_k(t)$ calculated using Equation (5) is performed (process numbers (5) and (6) in the drawing).

$$\text{Target}_k(t) = \begin{cases} \alpha \times \text{Target}_0(t) + \beta(\alpha \times \text{Target}_0(t) - b_k(t)) \\ 0, \text{ if } \alpha \times \text{Target}_0(t) + \beta(\alpha \times \text{Target}_0(t) - b_k(t)) < 0 \end{cases} \quad (5)$$

$$\sqrt{\text{Target}_k(t)} \exp\{i\Theta_k(t)\} \quad (6)$$

Subsequently, the initial object generating unit 25a performs an inverse Fourier transform of the function (6) described above from the time domain to the frequency domain (an arrow A2 in the drawing). In this way, a waveform function (7) of the frequency domain including an intensity spectrum function $C_k(\omega)$ and a phase spectrum function $\Psi_k(\omega)$ is acquired (a process number (7) in the drawing).

$$\sqrt{C_k(\omega)}\exp\{i\Psi_k(\omega)\} \quad (7)$$

Subsequently, in order to restrict the phase spectrum function $\Psi_k(\omega)$ included in the function (7) described above, the initial object generating unit 25a performs a substitution with the initial phase spectrum function $\Psi_0(\omega)$ (a second substitution; a process number (8) in the drawing).

$$\Psi_k(\omega) := \Psi_0(\omega) \quad (8)$$

In addition, the initial object generating unit 25a performs a filter process based on the intensity spectrum of the input light La for the intensity spectrum function $C_k(\omega)$ in the frequency domain after the inverse-Fourier transform. More specifically, portions of the intensity spectrum represented by the intensity spectrum function $C_k(\omega)$ that exceed a cutoff intensity of each wavelength set on the basis of the intensity spectrum of the input light La are filtered out. In one example, a cutoff intensity for each wavelength is set to coincide with the intensity spectrum of the input light La (in this embodiment, the initial intensity spectrum function $A_{k=0}(\omega)$. In such a case, as represented in the following Equation (9), for a frequency at which the intensity spectrum function $C_k(\omega)$ is larger than the initial intensity spectrum function $A_{k=0}(\omega)$, the value of the initial intensity spectrum function $A_k=0(\omega)$ is accepted as the value of the intensity spectrum function $A_k(\omega)$. In addition, for a frequency at which the intensity spectrum function $C_k(\omega)$ is equal to or smaller than the initial intensity spectrum function $A_{k=0}(\omega)$, the value of the intensity spectrum function $C_k(\omega)$ is accepted as the value of the intensity spectrum function $A_k(\omega)$.

$$A_k(\omega) = \begin{cases} A_{k=0}(\omega), & \text{if } A_{k=0}(\omega) < C_k(\omega) \\ C_k(\omega), & \text{if } A_{k=0}(\omega) \geq C_k(\omega) \end{cases} \quad (9)$$

The initial object generating unit 25a substitutes the intensity spectrum function $C_k(\omega)$ included in the function (7) described above with the intensity spectrum function $A_k(\omega)$ after a filter process according to Equation (9) described above. In addition, a method in which a cutoff intensity is relatively changed by defining a function $C'_k(\omega)$ acquired by multiplying the intensity spectrum function $C_k(\omega)$ by an arbitrary coefficient may be used (a process number (9) in the drawing).

Thereafter, the initial object generating unit 25a repeatedly performs the processes (1) to (9) described above a plurality of number of times, whereby the intensity spectrum function $A_k(\omega)$ in the waveform function can approach an intensity spectrum form corresponding to a desired time-intensity waveform. Finally, an intensity spectrum function $A_{IFTA}(\omega)$ is acquired.

The initial object generating unit 25a changes the intensity spectrum function $A_{IFTA}(\omega)$, thereby generating objects $A_1(\omega)$ to $A_M(\omega)$ of the first generation. More specifically, the initial object generating unit 25a generates the objects $A_1(\omega)$ to $A_M(\omega)$ of the first generation using the following Equation (10).

$$A_m(\omega) = A_{IFTA}(\omega) \times B_m(\omega) \quad (10)$$

Here, m represents an object number, and m is an integer equal to or greater than "1" and equal to or smaller than M. $B_m(\omega)$ is a probability function giving a change in the intensity spectrum function $A_{IFTA}(\omega)$. By appropriately setting this probability function $B_m(\omega)$, appropriate objects $A_1(\omega)$ to $A_M(\omega)$ of the first generation according to the intensity spectrum function $A_{IFTA}(\omega)$ can be generated.

For example, $A_{IFTA}(\omega) \times B_m(\omega)$ cannot exceed an intensity spectrum function $A_{pulse}(\omega)$ of input light La that is light to be modulated. When an upper limit of the range of a real number that may be taken by the probability function $B_m(\omega)$ is represented as a function $b_m(\omega)$, and a lower limit thereof is represented as a function $a_m(\omega)$, such functions $b_m(\omega)$ and $a_m(\omega)$ can be represented using the intensity spectrum functions $A_{IFTA}(\omega)$ and $A_{pulse}(\omega)$ as below. In the equation, s is a minute value that is inserted for convenience such that the denominator does not become zero.

$$b_m(\omega) = \frac{A_{pulse}(\omega)}{A_{IFTA}(\omega) + s} \quad (11)$$

$$a_m(\omega) = 0$$

Figure 10:
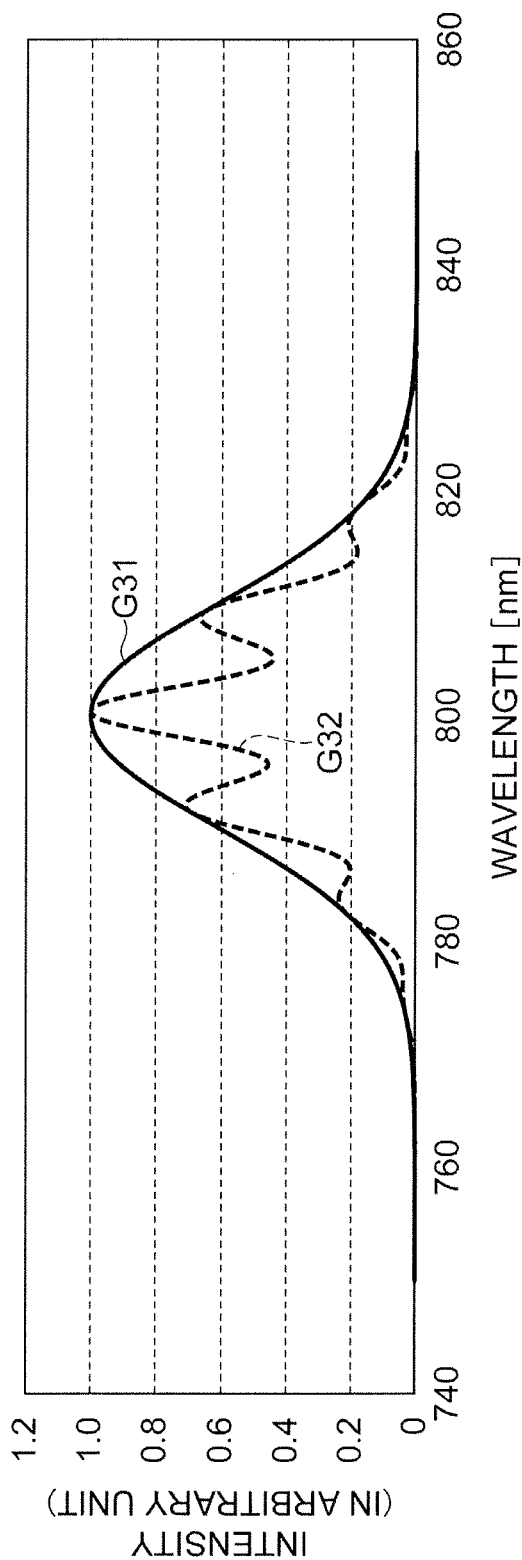
FIG. 10 is a graph illustrating one example of an intensity spectrum function $A_{pulse}(\omega)$ and an intensity spectrum function $A_{IFTA}(\omega)$ of input light La.

FIG. 10 is a graph illustrating one example of the intensity spectrum function $A_{pulse}(\omega)$ of input light La and the intensity spectrum function $A_{IFTA}(\omega)$. In FIG. 10, a graph G31 illustrates the intensity spectrum function $A_{pulse}(\omega)$, and a graph G32 illustrates the intensity spectrum function $A_{IFTA}(\omega)$. In addition, the horizontal axis represents a wavelength (unit: nm), and the vertical axis represents an intensity (in an arbitrary unit). Regarding the horizontal axis, by converting the wavelength into a frequency $\omega$, as is represented in equations and drawings in the text, the wavelength may be handled as a frequency $\omega$. As is illustrated in FIG. 10, this intensity spectrum function $A_{pulse}(\omega)$ follows a Gaussian distribution. In addition, the intensity spectrum function $A_{IFTA}(\omega)$, while oscillating between a maximum and a minimum, becomes a realistic intensity spectrum function not exceeding the intensity spectrum function $A_{pulse}(\omega)$ in the entire frequency region in accordance with an action according to Equation (9) described above.

Figure 11:
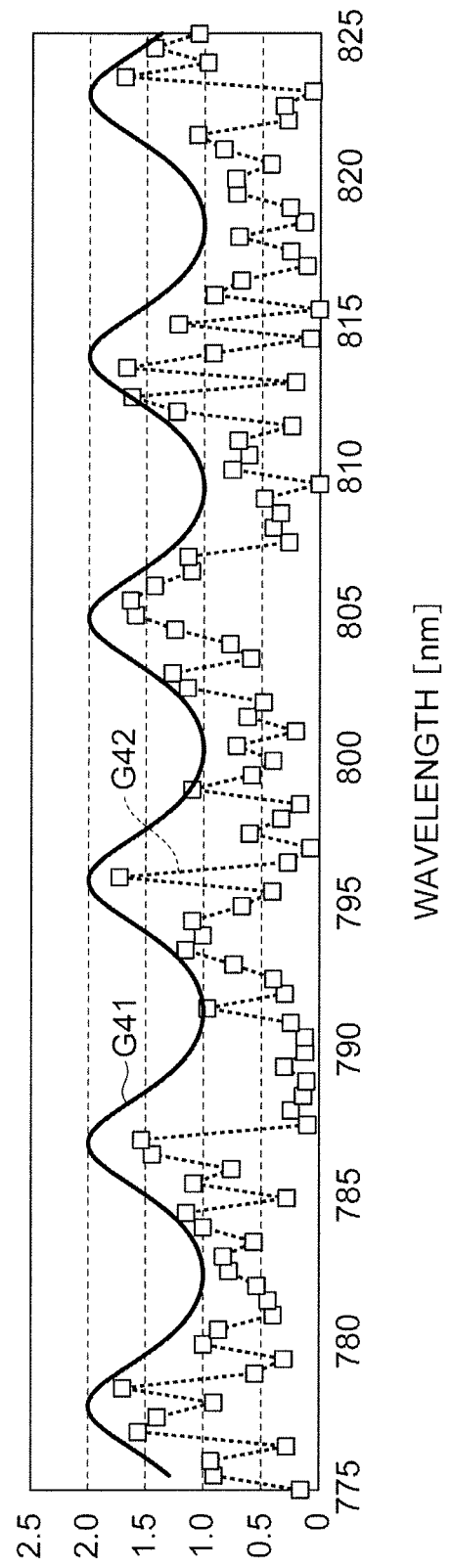
FIG. 11 is a graph illustrating an example of a function $b_m(\omega)$ in a case in which the intensity spectrum functions $A_{pulse}(\omega)$ and $A_{IFTA}(\omega)$ illustrated in FIG. 10 are used and a probability function $B_m(\omega)$ generated randomly (completely disorderly and appearance probabilities are the same) within a range having the function $b_m(\omega)$ as its upper limit and a function $a_m(\omega)$ (=0) as its lower limit.

FIG. 11 represents graphs illustrating a function $b_m(\omega)$ in a case in which the intensity spectrum functions $A_{pulse}(\omega)$ and $A_{IFTA}(\omega)$ illustrated in FIG. 10 are used and a probability function $B_m(\omega)$ generated randomly (completely chaotically and having the same appearance probability) within a range having the function $b_m(\omega)$ as its upper limit and the function $a_m(\omega)$ (=0) as its lower limit as an example. In FIG. 11, a graph G41 illustrates the function $b_m(\omega)$, and a graph G42 represents the probability function $B_m(\omega)$. In addition, the horizontal axis represents a wavelength (unit: nm), and the vertical axis represents values (real numbers) of the function $b_m(\omega)$ and the probability function $B_m(\omega)$. As illustrated in FIG. 11, by appropriately setting an upper limit and a lower limit of the probability function $B_m(\omega)$, objects $A_1(\omega)$ to $A_M(\omega)$ of the first generation can be generated randomly within the range of real numbers that can be taken realistically using Equation (10) described above. In addition, by arbitrarily narrowing a difference between the upper limit and the lower limit, in other words, a difference between the function $b_m(\omega)$ and the function $a_m(\omega)$, dispersion of the objects $A_1(\omega)$ to $A_M(\omega)$ of the first generation can be decreased. The probability function $B_m(\omega)$ may not be completely random, and, for example, the appearance probability of the function may follow a normal distribution.

FIGS. 7 and 8 will be referred to again. Next, in the evaluation value calculating step S12, the evaluation value calculating unit 26 transforms M first waveform functions (12) of the frequency domain including objects $A_1(\omega)$ to $A_m(\omega)$ of the n-th generation (here, n is an integer equal to or greater than "1") and a common phase spectrum function $\Psi(\omega)$ into M waveform functions (13) of the time domain respectively including time-intensity waveform functions $I_1(t)$ to $I_M(t)$ and time-phase waveform functions $\Phi_1(t)$ to $\Phi_M(t)$.

$$\sqrt{A_1(\omega)} \exp\{i\Psi_0(\omega)\}$$
$$\sqrt{A_2(\omega)} \exp\{i\Psi_0(\omega)\}$$
$$\vdots$$
$$\sqrt{A_M(\omega)} \exp\{i\Psi_0(\omega)\} \quad (12)$$

$$\sqrt{I_1(t)} \exp\{i\Phi_1(t)\}$$
$$\sqrt{I_2(t)} \exp\{i\Phi_2(t)\}$$
$$\vdots$$
$$\sqrt{I_M(t)} \exp\{i\Phi_M(t)\} \quad (13)$$

Such waveform functions (13) are second waveform functions according to this embodiment. Then, the evaluation value calculating unit 26 calculates M evaluation values representing degrees of differences between the time-intensity waveform functions $I_1(t)$ to $I_M(t)$ and a desired time-intensity waveform $T(t)$ (=$Target_0(t)$). For example, the evaluation value calculating unit 26 calculates standard deviations of the time-intensity waveform functions $I_1(t)$ to $I_M(t)$ with respect to the desired time-intensity waveform $T(t)$. At this time, when there are energy differences between the desired time-intensity waveform $T(t)$ and the time-intensity waveform functions $I_1(t)$ to $I_M(t)$, evaluation values change due to the energy differences. In this embodiment, in order to compensate for these energy differences, a search-type evaluation function is introduced. More specifically, the evaluation value calculating unit 26, as represented in the following Equation (14), calculates M evaluation values representing respective degrees of differences between the time-intensity waveform functions $I_1(t)$ to $I_M(t)$ and functions acquired by multiplying the function $T(t)$ representing the desired time-phase waveform by coefficients $\alpha_1$ to $\alpha_M$.

$$\sigma_{min1} = \sqrt{\frac{1}{D}\sum(\alpha_1 \times T(t) - I_1(t))^2} \quad (14)$$

-continued
$$\sigma_{min2} = \sqrt{\frac{1}{D}\sum(\alpha_2 \times T(t) - I_2(t))^2}$$
$$\vdots$$
$$\sigma_{minM} = \sqrt{\frac{1}{D}\sum(\alpha_M \times T(t) - I_M(t))^2}$$

The coefficients $\alpha_1$ to $\alpha_M$ have values for which evaluation values become superior to those before the multiplication using the coefficients $\alpha_1$ to $\alpha_M$. Equation (14) represents standard deviations of the time-intensity waveform functions $I_1(t)$ to $I_M(t)$ with respect to functions respectively acquired by multiplying the function $T(t)$ representing the desired time-phase waveform by the coefficients $\alpha_1$ to $\alpha_M$ as one example of the evaluation values. In this example, the coefficients $\alpha_1$ to $\alpha_M$ are changed such that each standard deviation takes a minimum value. Then, the minimum values $\sigma_{min1}$ to $\sigma_{minM}$ of the standard deviations are respectively set as evaluation values of the time-intensity waveform functions $I_1(t)$ to $I_M(t)$.

Subsequently, on the basis of the M evaluation values (more specifically, minimum values $\sigma_{min1}$ to $\sigma_{minM}$ of the standard deviation) calculated in the evaluation value calculating step S12, the object selecting unit 27 selects two or more objects used for generating a plurality of objects $A_1(\omega)$ to $A_M(\omega)$ of the (n+1)-th generation among a plurality of objects $A_1(\omega)$ to $A_M(\omega)$ of the n-th generation (an object selecting step S13). In this object selecting step S13, two or more objects are selected on the basis of superiority of M evaluation values. Here, "on the basis of superiority," for example, means that an object group G1 (a first object group) formed from at least one object selected from M objects $A_1(\omega)$ to $A_M(\omega)$ of the n-th generation has an evaluation value superior to those of all the other objects not included in the object group G1 among the M objects $A_1(\omega)$ to $A_M(\omega)$. Alternatively, it may mean that an average of evaluation values of the object group G1 formed from one or more objects selected from M objects $A_1(\omega)$ to $A_M(\omega)$ of the n-th generation is superior to an average of evaluation values of the M objects $A_1(\omega)$ to $A_M(\omega)$. Hereinafter, this object group G1 may be referred to as an "elite object group."

In this embodiment, in the object selecting step S13, two or more objects selected by the object selecting unit 27 may include an object group G2 (a second object group) formed from at least one other object in addition to the elite object group G1. In such a case, an average of evaluation values of the object group G2 is inferior to the average of the evaluation values $\sigma_{min1}$ to $\sigma_{minM}$ of the M objects $A_1(\omega)$ to $A_M(\omega)$ of the n-th generation. Hereinafter, this object group G2 may be referred to as a "non-elite object group." In a case in which the evaluation values of the M objects $A_1(\omega)$ to $A_M(\omega)$ are aligned in the order of high to low superiority, the evaluation values of the non-elite object group G2 are not continuous from the evaluation values of the elite object group G1. In other words, in M objects $A_1(\omega)$ to $A_M(\omega)$, there are one or more objects having evaluation values that are inferior to a most inferior evaluation value of the elite object group G1 and are superior to a most superior evaluation value of the non-elite object group G2.

Subsequently, in the next-generation generating step S14, the next-generation generating unit 28 generates M objects $A_1(\omega)$ to $A_M(\omega)$ of the (n+1)-th generation on the basis of two or more objects selected by the object selecting unit 27 in the object selecting step S13. Here, "generating a plurality of objects of the (n+1)-th generation on the basis of two or more selected objects," for example, means a process such as crossing, mutation, and proliferation and means that each of M objects $A_1(\omega)$ to $A_M(\omega)$ of the (n+1)-th generation includes at least a component of a part of one object of the n-th generation. In addition, some of the selected two or more objects (for example, a most superior object group) may be directly set as one of objects $A_1(\omega)$ to $A_M(\omega)$ of the (n+1)-th generation.

In the intensity spectrum function generating step S1, the evaluation value calculating step S12, the object selecting step S13, and the next-generation generating step S14 described above are repeated while 1 is added to n each time until a predetermined condition is satisfied (Step S15). In other words, the evaluation value calculating unit 26, the object selecting unit 27, and the next-generation generating unit 28 repeat the processes while adding 1 to n each time until a predetermined condition is satisfied. Then, the intensity spectrum designing unit 23 (in the intensity spectrum function generating step S1) generates an intensity spectrum function $A(\omega)$ that is appropriate for the desired time-intensity waveform on the basis of M objects $A_1(\omega)$ to $A_M(\omega)$ of the n-th generation of a case in which a predetermined condition is satisfied. For example, one object $A_m(\omega)$ may be extracted from among M objects $A_1(\omega)$ to $A_M(\omega)$ and set as the intensity-spectrum function $A(\omega)$. Here, the predetermined condition, for example, is a case in which the number of iteration trials that is arbitrarily set ends or a case in which an evaluation value that is arbitrarily set is satisfied.

After the processes described above, in the data generating step S2, the modulation pattern generating unit 24 generates data relating to a modulation pattern to be presented to the SLM 14 on the basis of the phase spectrum function $\Psi(\omega)$ and the intensity spectrum function $A(\omega)$ generated in the intensity spectrum function generating step S1. The modulation pattern generating unit 24 provides the generated data for the SLM 14 as a control signal SC.

Effects acquired by the light control device 1A, the modulation pattern calculating device 20, the modulation pattern calculating method, and the computer-readable recording medium according to this embodiment described above will be described. Conventionally, when light having a desired time waveform is realized using the SLM, in order to improve the accuracy of a spectrum intensity corresponding to a desired time waveform, the iterative Fourier method or a method with a modified iterative Fourier method (for example, see Patent Documents 1 and 2) is used. However, by trying generation of a multi-pulse or the like using such a method, the waveform control accuracy is improved greatly. However, when the shape of the waveform was analyzed in detail, it was checked that there were dispersions (deviations) in peak value or pulse widths of the pulses. This means that there is room for improving the technique for designing a waveform control pattern. Particularly, in a case in which applications of pulse light to a microscope or processing are considered, there is a possibility that a change in the pulse width and a change in the peak value has a large influence on a change in an S/N ratio of a signal and a change in the processing state. Accordingly, a technique enabling design of a waveform control pattern with higher accuracy is preferable.

In response to such problems, in the modulation pattern calculating device 20, the modulation pattern calculating method, and the modulation pattern calculating program according to this embodiment, two or more objects used for generation of M objects $A_1(\omega)$ to $A_M(\omega)$ of the next generation are selected on the basis of superiority of evaluation values representing degrees of differences between the time-intensity waveform functions $I_1(t)$ to $I_M(t)$ and the desired time-intensity waveform $T(t)$. Then, M objects $A_1(\omega)$ to $A_M(\omega)$ of the (n+1)-th generation are generated on the basis of the two or more selected objects. Such a process is repeated while 1 is added to n each time until a predetermined condition is satisfied, and an intensity spectrum function $A(\omega)$ that is appropriate for the desired time-intensity waveform $T(t)$ is generated on the basis of the M objects $A_1(\omega)$ to $A_M(\omega)$ of the n-th generation of a case in which the predetermined condition is satisfied. As a result of research conducted by the inventors of the present invention, it has been found that, according to such a system (a genetic algorithm), compared to an iterative Fourier method and a method with a modified iterative Fourier method, a ratio at which the intensity spectrum function $A(\omega)$ is led into a local solution is decreased, and an optimal solution can be retrieved more accurately.

Figure 12A:
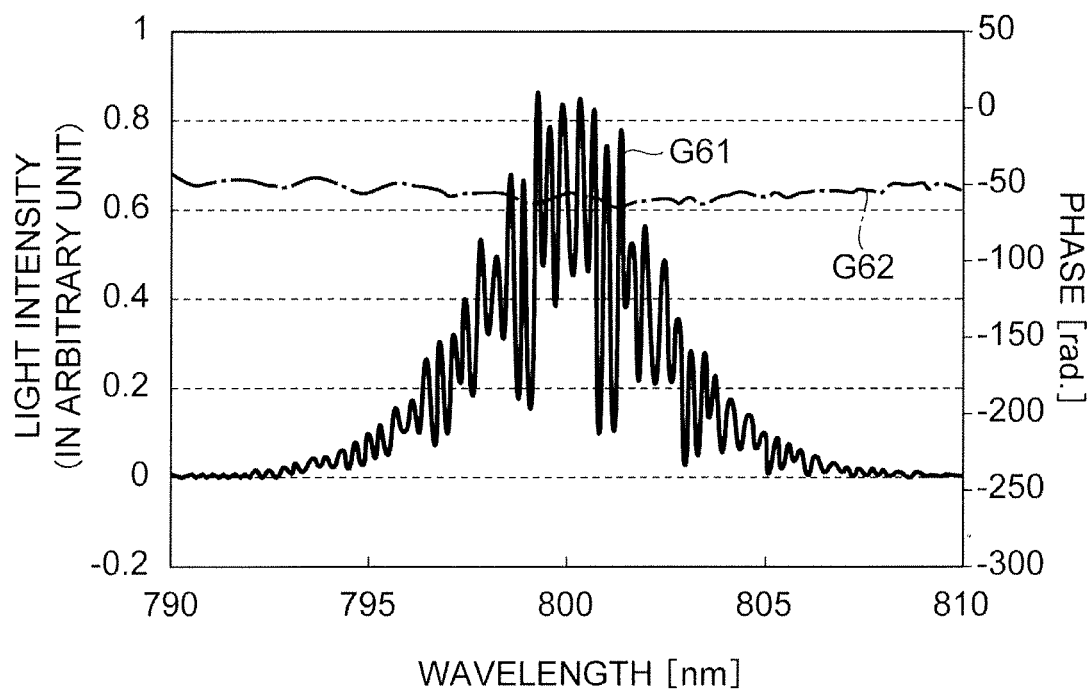
FIG. 12A is a graph illustrating an intensity spectrum function $A(\omega)$ for generating output light Ld of 8 pulses calculated by a modulation pattern calculating device 20 and a modulation pattern calculating method according to a first embodiment as an example.
Figure 12B:
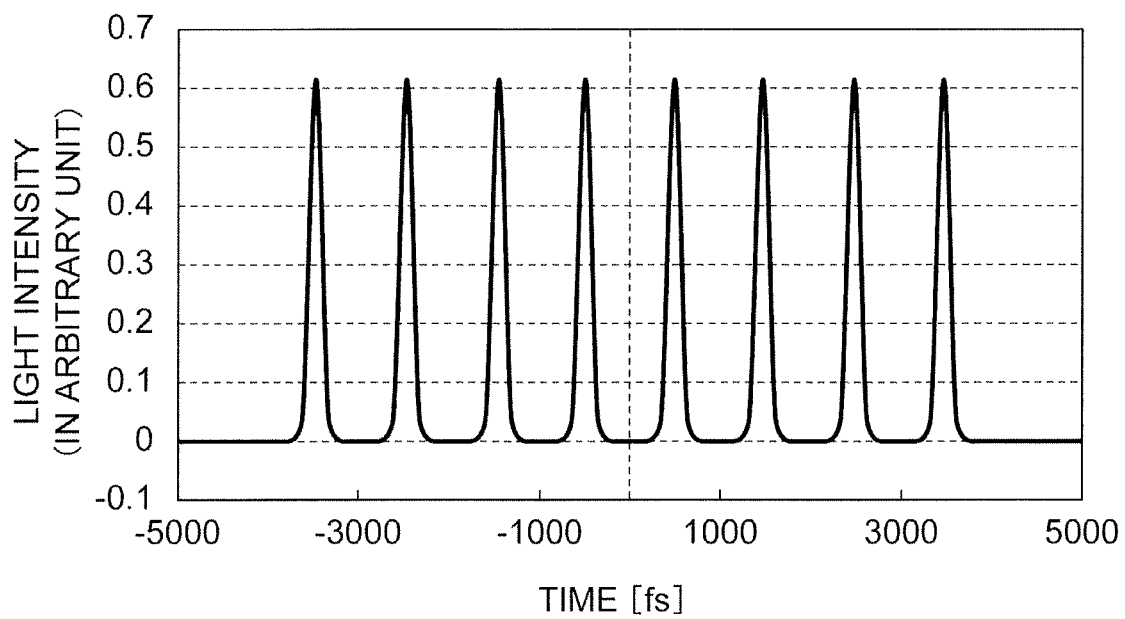
FIG. 12B is a graph illustrating a time-intensity waveform of output light Ld acquired by presenting a modulation pattern based on the intensity spectrum function A(ω) and a phase spectrum function Ψ(ω) illustrated in FIG. 12A to the SLM 14.
Figure 13A:
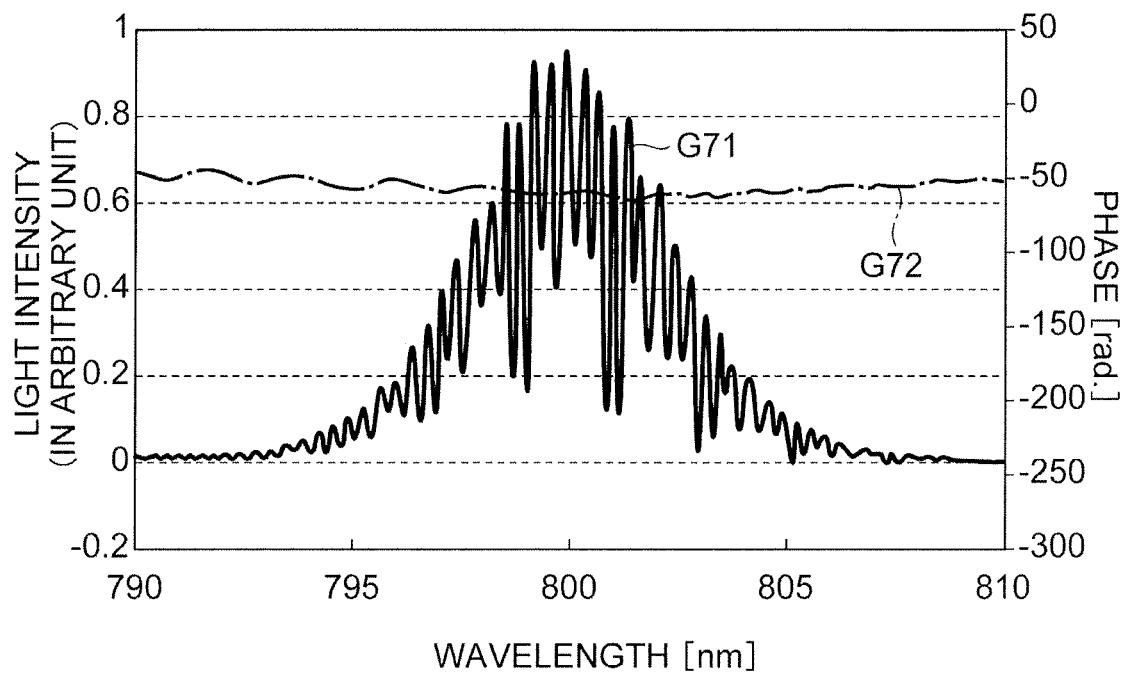
FIG. 13A is a graph illustrating an intensity spectrum function A(ω) for generating output light Ld of 8 pulses calculated using only an iterative Fourier method as a comparative example.
Figure 13B:
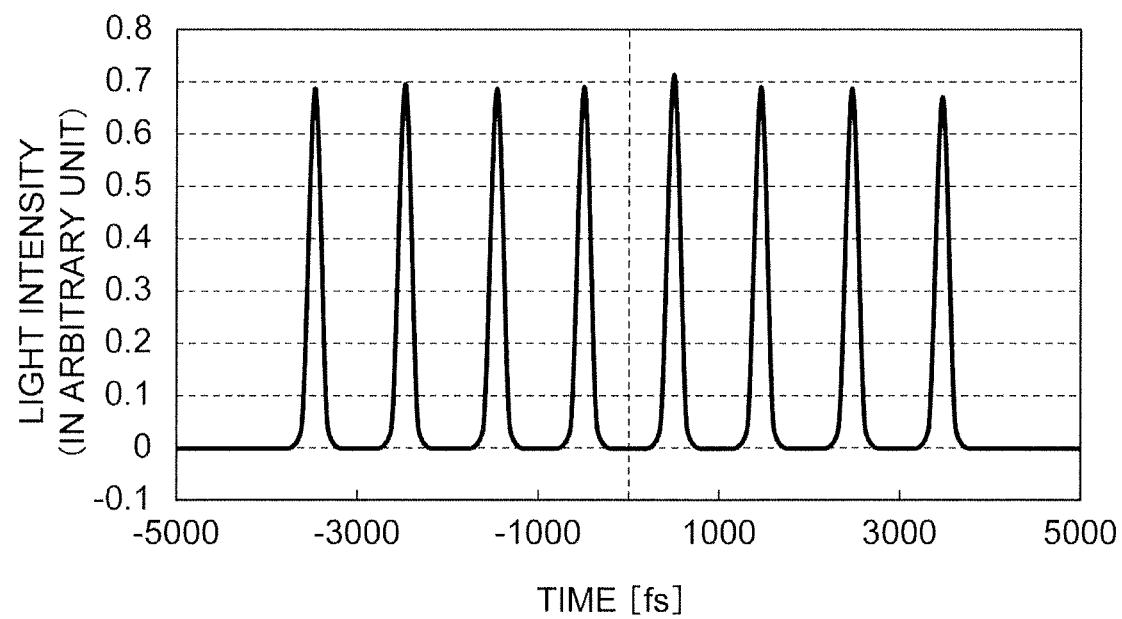
FIG. 13B is a graph illustrating a time-intensity waveform of output light Ld acquired by presenting a modulation pattern based on the intensity spectrum function A(ω) and a phase spectrum function Ψ(ω) illustrated in FIG. 13A to the SLM 14.

FIG. 12A represents graphs illustrating an intensity spectrum function $A(\omega)$ for generating output light Ld of eight pulses calculated by the modulation pattern calculating device 20 and the modulation pattern calculating method according to this embodiment as one example. A graph G61 illustrates the intensity spectrum function $A(\omega)$. In addition, a graph G62 illustrates a phase spectrum function $\Psi(\omega)$ used in this example. This phase spectrum function $\Psi(\omega)$ is calculated using the iterative Fourier method. FIG. 12B is a graph illustrating a time-intensity waveform of output light Ld acquired by presenting a modulation pattern based on the intensity spectrum function $A(\omega)$ and the phase spectrum function $\Psi(\omega)$ illustrated in FIG. 12A to the SLM 14. In addition, FIG. 13A is a graph illustrating an intensity spectrum function $A(\omega)$ for generating output light Ld of eight pulses calculated using only the iterative Fourier method as a comparative example. A graph G71 illustrates the intensity spectrum function $A(\omega)$ thereof. In addition, a graph G72 illustrates a phase spectrum function $\Psi(\omega)$ used in this comparative example. The pattern of this phase spectrum function $\Psi(\omega)$ is the same as that of the graph G62 illustrated in FIG. 12A. FIG. 13B is a graph illustrating a time-intensity waveform of output light Ld acquired by presenting a modulation pattern based on the intensity spectrum function $A(\omega)$ and the phase spectrum function $\Psi(\omega)$ illustrated in FIG. 13A to the SLM 14.

By referring to FIG. 13B, it can be understood that there are large variations in the peak intensities of the eight pulses in the time-intensity waveform of the generated output light Ld in a case in which the intensity spectrum function $A(\omega)$ is calculated using only the iterative Fourier method. In contrast to this, by referring to FIG. 12B, in a case in which an intensity spectrum function $A(\omega)$ is calculated in accordance with the modulation pattern calculating device 20 and the modulation pattern calculating method according to this embodiment, while the amount of loss in the intensity is 39%, which is larger than 31% according to the iterative Fourier method, variations in the peak intensities of eight pulses in the time-intensity waveform of generated output light Ld are inhibited to be small. Regarding the evaluation value, a value according to this embodiment becomes 1/8.7 of the value according to the iterative Fourier method, which shows much enhancement.

In this way, according to the modulation pattern calculating device 20 and the modulation pattern calculating method according to this embodiment, compared to a conventional device and a conventional method using only the iterative Fourier method, a ratio at which the intensity spectrum function is led to a local solution is decreased, and an optical solution can be retrieved more accurately. In other words, according to this embodiment, a spectrum intensity for causing the time waveform of the output light Ld to approach a desired waveform T(t) is calculated with high accuracy, and a desired time waveform can be acquired with high accuracy. In addition, although the numbers of objects of generations are uniformized as M, the number of objects of each generation may be changed.

Figure 14:
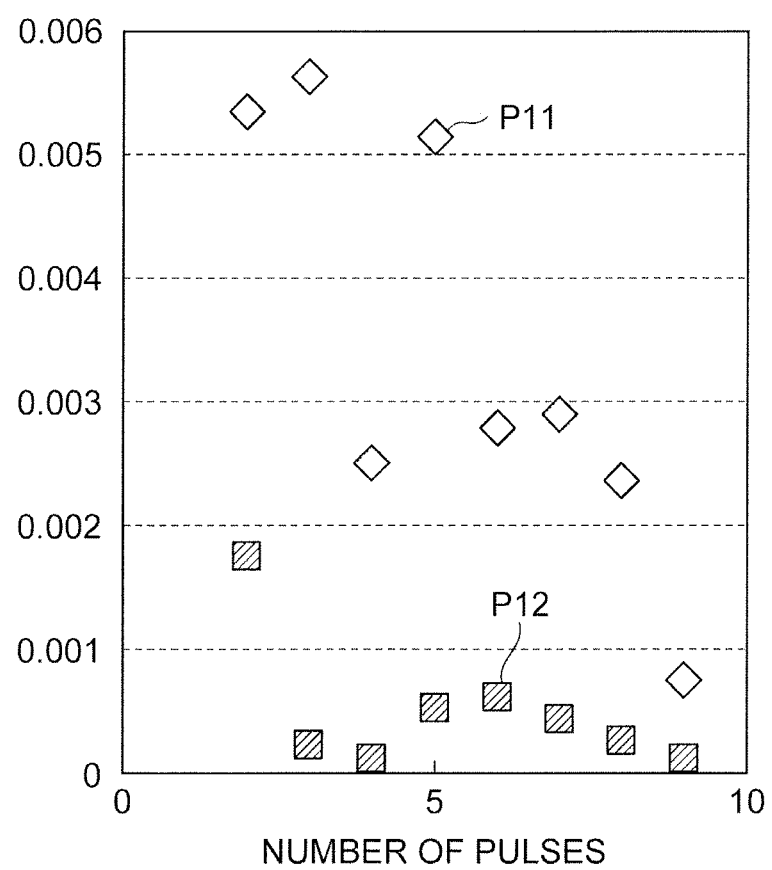
FIG. 14 is a graph in which a relation between the number of pulses at that time and an evaluation value (a minimum value of standard deviations represented in Equation (14)) is plotted.

Here, in order to check the validity of this embodiment, a plurality of modulation patterns for generating output light Ld having a time-intensity waveform including multiple pulses were calculated while changing the number of pulses. Each pulse was a TL pulse (a single pulse having a time width of 135 fs), and a pulse interval was an equal interval of 1 ps. As an initial phase spectrum $\Psi0(\omega)$, a phase spectrum calculated using the iterative Fourier method was used. FIG. 14 represents graphs in which relations between the number of pulses at that time and an evaluation value (the minimum value of the standard deviation represented in Equation (14)) are plotted. In FIG. 14, a plot P11 illustrates a case in which an intensity spectrum function $A(\omega)$ is calculated using a conventional method using only the iterative Fourier method, and a plot P12 illustrates a case in which an intensity spectrum function $A(\omega)$ is calculated using the method according to this embodiment. In the calculation of the intensity spectrum function $A(\omega)$ according to the method of this embodiment, Steps S12 to S14 were sufficiently repeated until the evaluation value converged. The number of iterations (the number of generations) was 1,700. As illustrated in FIG. 14, for any number of pulses, according to the method of this embodiment, compared to a conventional method, the waveform control accuracy (the evaluation value) is enhanced greatly. Although there is a difference according to the number of pulses, it was confirmed that enhancement of about 3 times to 24 times can be expected.

Figure 15:
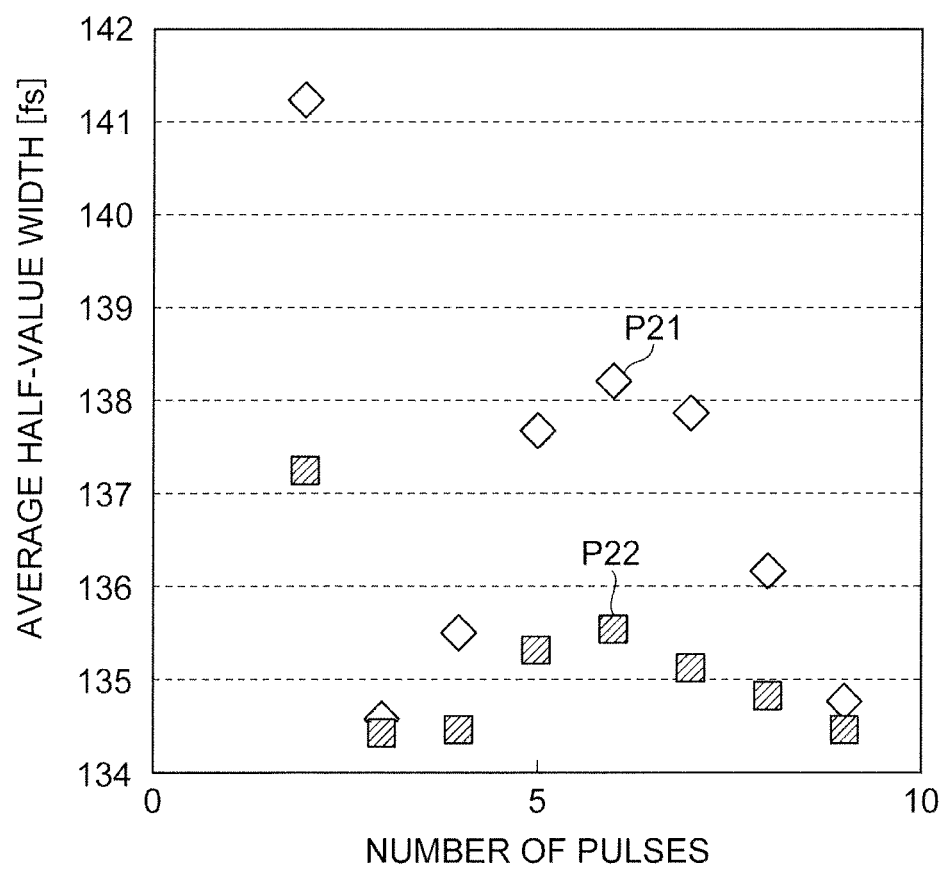
FIG. 15 is a graph in which a relation between the number of pulses and an average pulse width (a full-width at half maximum) according to the example described above is plotted.
Figure 16:
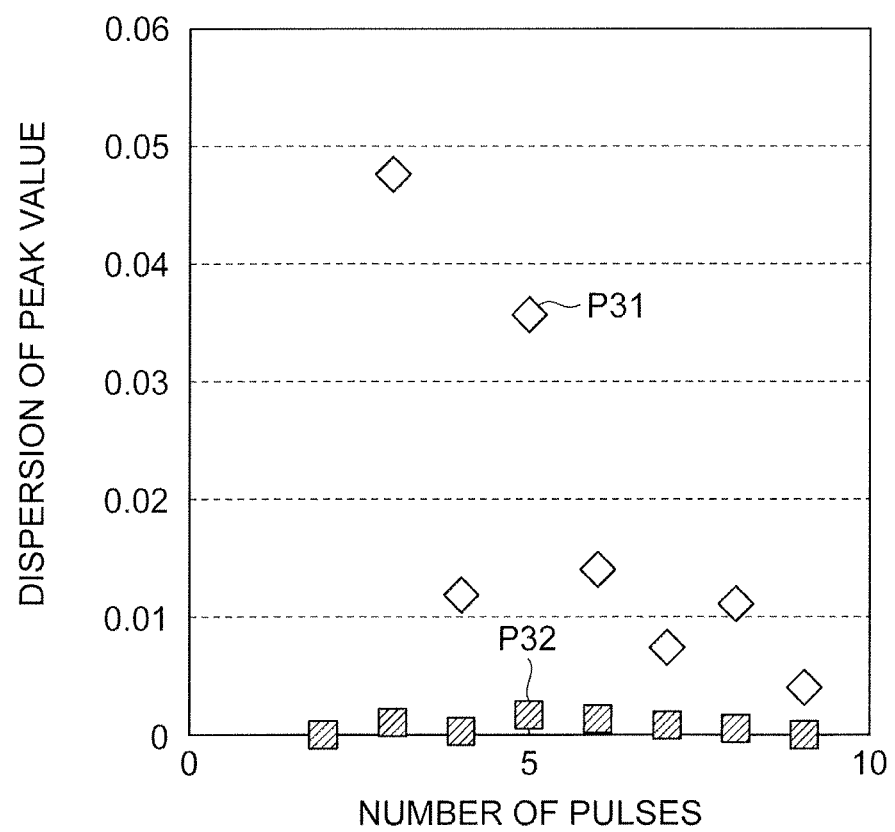
FIG. 16 is a graph in which a relation between the number of pulses and dispersion of peak values according to the example described above is plotted.

In addition, FIG. 15 illustrates a graph in which a relation between the number of pulses and an average pulse width (a full width at half maximum) according to the example described above is plotted. FIG. 16 is a graph in which a relation between the number of pulses and dispersion of a peak value according to the example described above is plotted. In FIGS. 15 and 16, plots P21 and P31 illustrate a case in which an intensity spectrum function $A(\omega)$ is calculated using a conventional method using only the iterative Fourier method, and plots P22 and P32 illustrate a case in which an intensity spectrum function $A(\omega)$ is calculated using the method according to this embodiment. On the basis of such drawings, it is conceived that the enhancement of the evaluation value illustrated in FIG. 14 is due to a narrow pulse width (near the half-value width of a TL pulse) and a decrease in the variation of the peak value.

As in this embodiment, the initial value setting unit 25 (the initial value setting step S11) may include the initial object generating unit 25a (the initial object generating step S11a) generating objects $A_1(\omega)$ to $A_M(\omega)$ of the first generation. Then, the initial object generating unit 25a (the initial object generating step S11a) may generate objects $A1(\omega)$ to $AM(\omega)$ of the first generation by generating an intensity spectrum function $A_{IFTA}(\omega)$ using the iterative Fourier transform and changing the intensity spectrum function $A_{IFTA}(\omega)$. According to the knowledge of the inventors of the present invention, in order to retrieve an optimal solution more accurately using the modulation pattern calculating device 20 according to this embodiment, it is extremely important to set the objects $A_1(\omega)$ to $A_M(\omega)$ of the first generation. The iterative Fourier method has a feature that a solution having a superior evaluation value can be calculated in a short time. In addition, there are cases in which a solution having higher evaluation value is present near the solution. Accordingly, by generating an intensity spectrum function $A_{IFTA}(\omega)$ that becomes a base of the objects $A_1(\omega)$ to $A_M(\omega)$ of the first generation using the iterative Fourier method, the objects $A_1(\omega)$ to $A_M(\omega)$ of the first generation can be appropriately set.

In addition, as in this embodiment, the evaluation value calculating unit 26 (the evaluation value calculating step S12) may calculate M evaluation values representing degrees of differences between the time-intensity waveform functions $I_1(t)$ to $I_M(t)$ and functions acquired by multiplying the function T(t) representing a desired time-phase waveform by the coefficients $\alpha_1$ to $\alpha_M$, and the coefficients $\alpha_1$ to $\alpha_M$ may have values for which the evaluation values after multiplication are superior to the evaluation values before multiplication. In this way, by inhibiting the influence of a difference in total energies of the desired time-intensity waveform T(t) and the time-intensity waveform functions $I_1(t)$ to $I_M(t)$ on the calculation of evaluation values, the evaluation values can be calculated mainly on the basis of a difference between patterns of the desired time-intensity waveform T(t) and the time-intensity waveform functions $I_1(t)$ to $I_M(t)$.

In addition, as in this embodiment, two or more objects selected by the object selecting unit 27 (the object selecting step S13) may include an object group G1 formed from at least one object and an object group G2 formed from at least one other object. An average of evaluation values of the object group G1 may be superior to an average of evaluation values of the objects $A_1(\omega)$ to $A_M(\omega)$ of the n-th generation, and an average of evaluation values of the object group G2 may be inferior to an average of the evaluation values of the objects $A_1(\omega)$ to $A_M(\omega)$ of the n-th generation.

Figure 17:
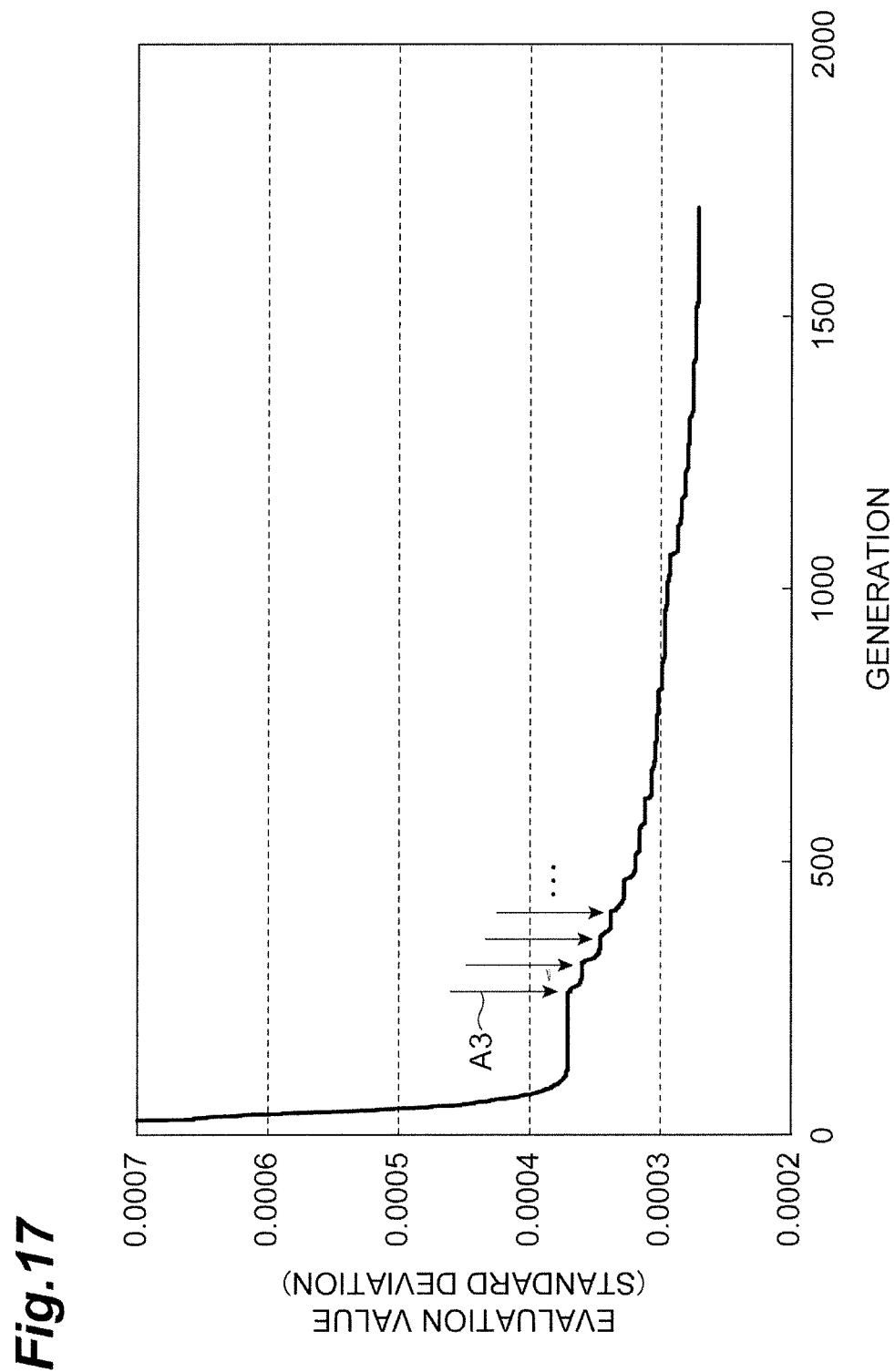
FIG. 17 is a graph illustrating an appearance in which an evaluation value changes in accordance with the generation transitions.

In the genetic algorithm as in this embodiment, when the number of generations transitions, a plurality of objects $A_1(\omega)$ to $A_M(\omega)$ gradually become approximately uniform. Thus, the evaluation values converge, and further enhancement cannot be seen, or the degree of enhancement markedly decreases. Thus, in this embodiment, the object group G2 formed from non-elite objects is included in two or more objects selected by the object selecting unit 27 (the object selecting step S13). FIG. 17 is a graph illustrating an appearance in which an evaluation value changes in accordance with transition of a generation in a case in which an intensity spectrum function $A(\omega)$ (see FIG. 12A) for generating output light Ld of eight pulses is calculated. In FIG. 17, the horizontal axis represents a generation, and the vertical axis represents an evaluation value (a minimum value $\sigma_{min}$ of a standard deviation). In the example illustrated in FIG. 17, while the evaluation value converges once in the vicinity of about 150th generation, by introducing a non-elite object in the vicinity of about 250th generation (denoted using an arrow A3 in the drawing), the evaluation value discontinuously decreases (is enhanced). Then, every time a non-elite object is introduced thereafter, the evaluation value discontinuously decreases (is enhanced). In this way, by introducing non-elite objects to two or more objects selected by the object selecting unit 27 (the object selecting step S13), the evaluation value departs from a value converging once and can become more superior.

Figure 18:
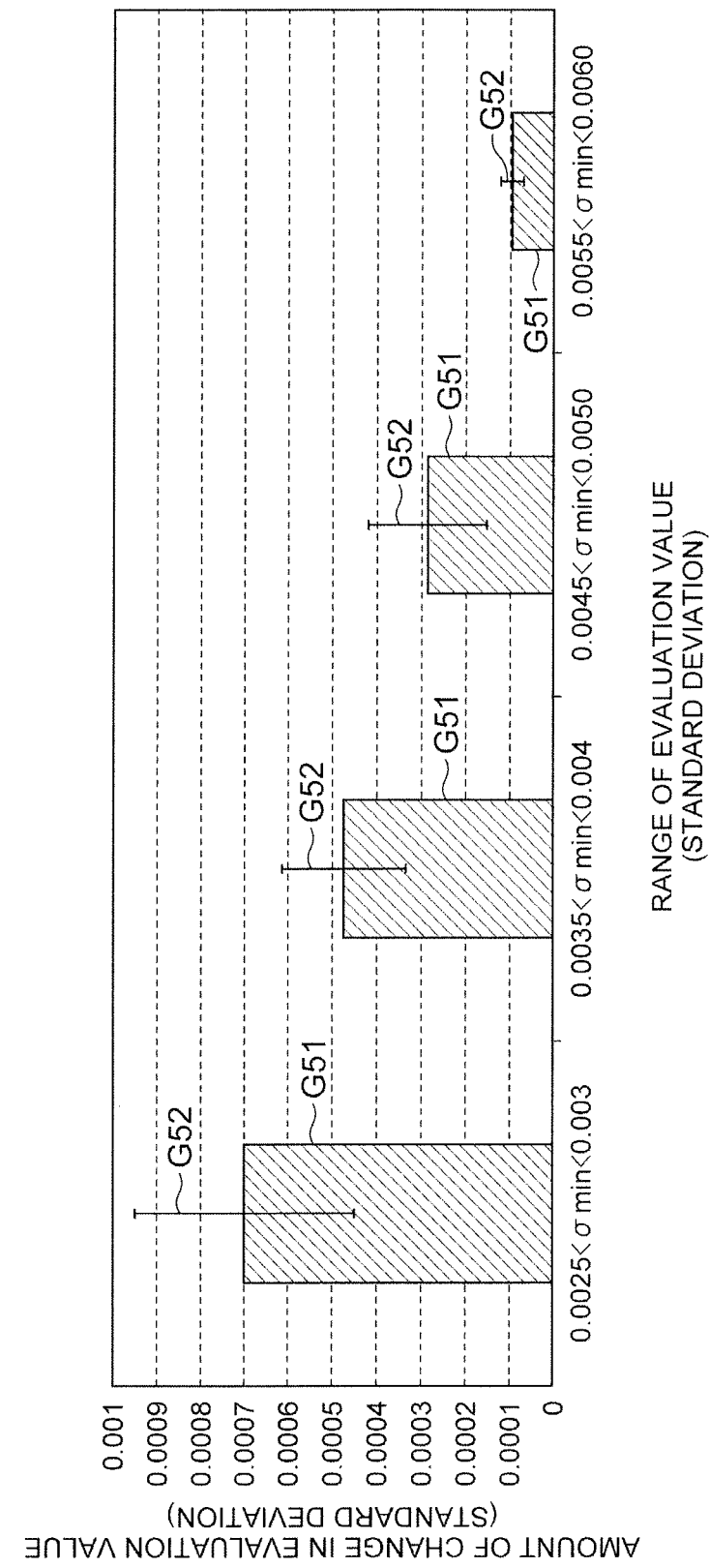
FIG. 18 illustrates the amount of change of an evaluation value before and after introduction of a non-elite object.

The inventors of the present invention further researched non-elite objects that are effective. FIG. 18 illustrates amounts of change in the evaluation value before and after introduction of non-elite objects. In this example, non-elite objects configuring an object group G2 were divided into four groups ($0.0025 < \sigma_{min} < 0.003$, $0.0035 < \sigma_{min} < 0.004$, $0.0045 < \sigma_{min} < 0.005$, and $0.0055 < \sigma_{min} < 0.006$) for each range of the evaluation value, and individual calculation was performed. The introduction of non-elite objects was performed through calculation in which the evaluation value converges at a value approximately from 0.0015 to 0.0025. In FIG. 18, a graph G51 illustrates an average of the amounts of change in the evaluation value when calculation for each range is performed a plurality of times, and a graph G52 illustrates a presence range of the amount of change in the evaluation value in each range at that time. As seen with reference to FIG. 18, the evaluation value meaningfully changes from a converging value in a more superior direction regardless of the evaluation value of the non-elite object. In addition, in this calculation condition, it can be understood that, as the evaluation value of a non-elite object is more superior (a smaller standard deviation), the evaluation value greatly changes from a converging value in a superior direction, and a marked effect is acquired.

In this way, according to trials performed by the inventors of the present invention, by including a non-elite object having a relatively inferior evaluation value in some objects after selection, the calculation accuracy of a final spectrum intensity can be further improved.

According to the light control device 1A of this embodiment, by including the modulation pattern calculating device 20, the spectrum intensity is calculated with higher accuracy by decreasing a ratio of being led into a localized solution, and the time waveform of the output light Ld can be caused to approach the desired waveform T(t).

In the description presented above, although the configuration of the intensity spectrum designing unit 23 and the method of calculating a spectrum intensity have been mainly described, as the configuration of the phase spectrum designing unit 22 and the method of calculating a spectrum phase, a conventional configuration and a conventional method (for example, the iterative Fourier method or a modified method thereof) may be used, or a configuration and a method similar to the configuration of the intensity spectrum designing unit 23 and the method of calculating a spectrum intensity according to this embodiment may be used.

Second Embodiment

Figure 19:
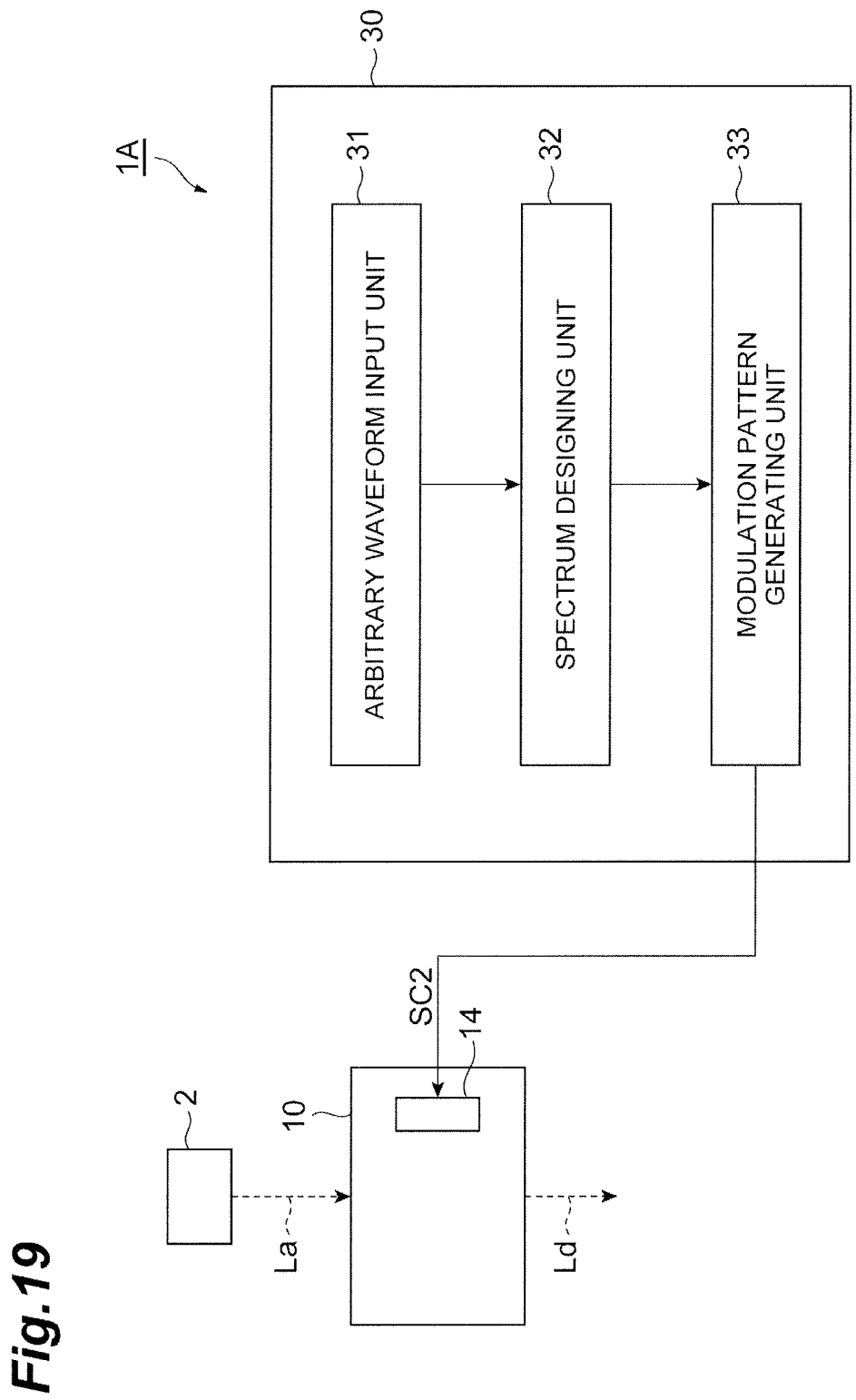
FIG. 19 is a diagram schematically illustrating the configuration of a light control device 1B according to a second embodiment of the present invention.

FIG. 19 is a diagram schematically illustrating the configuration of a light control device 1B according to a second embodiment of the present invention. The light control device 1B according to this embodiment generates an optical pulse train including a plurality of optical pulses aligned with a time interval interposed therebetween as output light Ld from input light La. The optical pulse train includes a plurality of optical pulses $LP_1$ to $LP_N$ (here, N is an integer equal to or greater than "2"). Each of the optical pulses $LP_1$ to $LP_N$, for example, has an extremely short time width such as 100 fs or less. An appearance timing of each of the optical pulses $LP_1$ to $LP_N$ is arbitrary, and a time interval with a previous optical pulse adjacent thereto may be the same or different for each of the optical pulses $LP_2$ to $LP_N$. In addition, peak intensities of the optical pulses $LP_2$ to $LP_N$ may be the same or different from each other.

The light control device 1B includes a light source 2, an optical system 10, and a modulation pattern calculating device (a data generating device) 30. The configurations of the light source 2 and the optical system 10 are similar to those according to the first embodiment (see FIG. 2). The hardware configuration of the modulation pattern calculating device 30 is similar to that of the modulation pattern calculating device 20 (see FIG. 6) according to the first embodiment. The modulation pattern calculating device 30 is electrically connected to an SLM 14, calculates a phase modulation pattern for causing a time-intensity waveform of the output light Ld to approach an optical pulse train having a desired peak intensity and a desired time interval, and provides a control signal SC2 including the phase modulation pattern for the SLM 14. The modulation pattern calculating device 30 according to this embodiment presents a phase pattern including a phase pattern used for phase modulation for giving a phase spectrum for acquiring a desired optical pulse train to the output light Ld and an phase pattern used for intensity modulation for giving an intensity spectrum for acquiring a desired optical pulse train to the output light Ld to the SLM 14. For this reason, the modulation pattern calculating device 30 includes an arbitrary waveform input unit 31, a spectrum designing unit 32, and a modulation pattern generating unit (a data generating unit) 33. In other words, a processor 201 (see FIG. 6) of a computer disposed in the modulation pattern calculating device 30 realizes the function of the arbitrary waveform input unit 31, the function of the spectrum designing unit 32, and the function of the modulation pattern generating unit 33.

The arbitrary waveform input unit 31 accepts an input of information relating to a desired optical pulse train from an operator. The operator inputs information relating to a desired optical pulse train (the number of optical pulses, a peak intensity of each optical pulse, a time interval, and the like) to the arbitrary waveform input unit 31. The information relating to the desired optical pulse train is given to the spectrum designing unit 32. The spectrum designing unit 32 calculates a phase spectrum and an intensity spectrum of the output light Ld that are appropriate for realization of the given desired optical pulse train. The modulation pattern generating unit 33 calculates a phase modulation pattern (for example, computer-generated holograms) for giving the phase spectrum and the intensity spectrum acquired by the spectrum designing unit 32 to the output light Ld. Then, a control signal SC2 including the calculated phase modulation pattern is provided for the SLM 14, and the SLM 14 is controlled on the basis of the control signal SC2.

Figure 20:
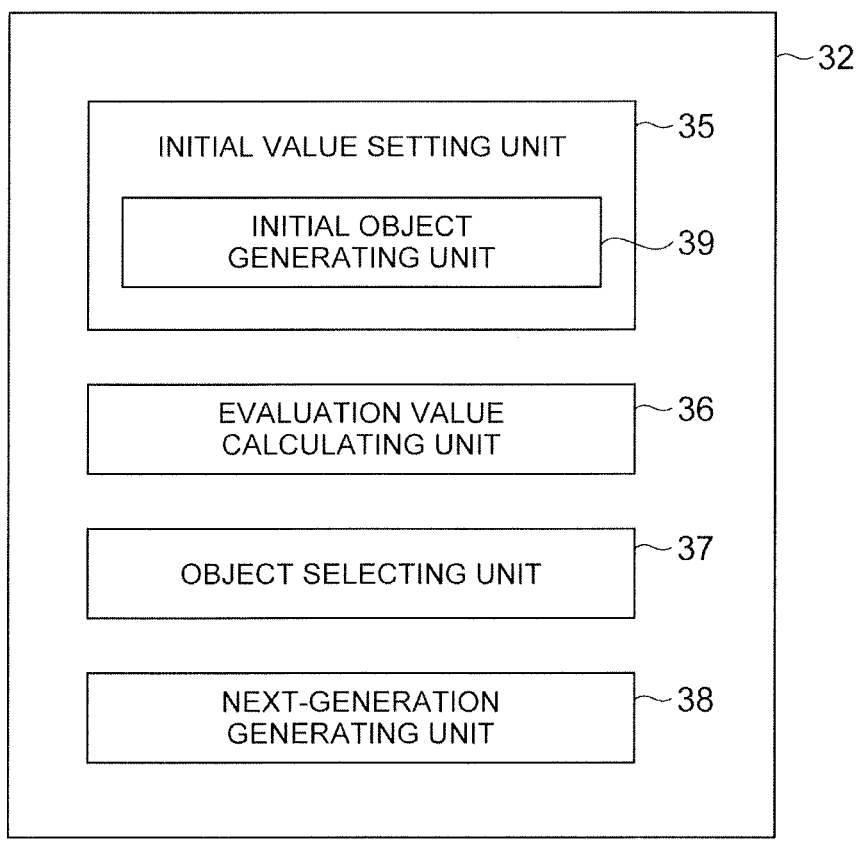
FIG. 20 is a diagram schematically illustrating one example of an optical pulse train.
Figure 21:
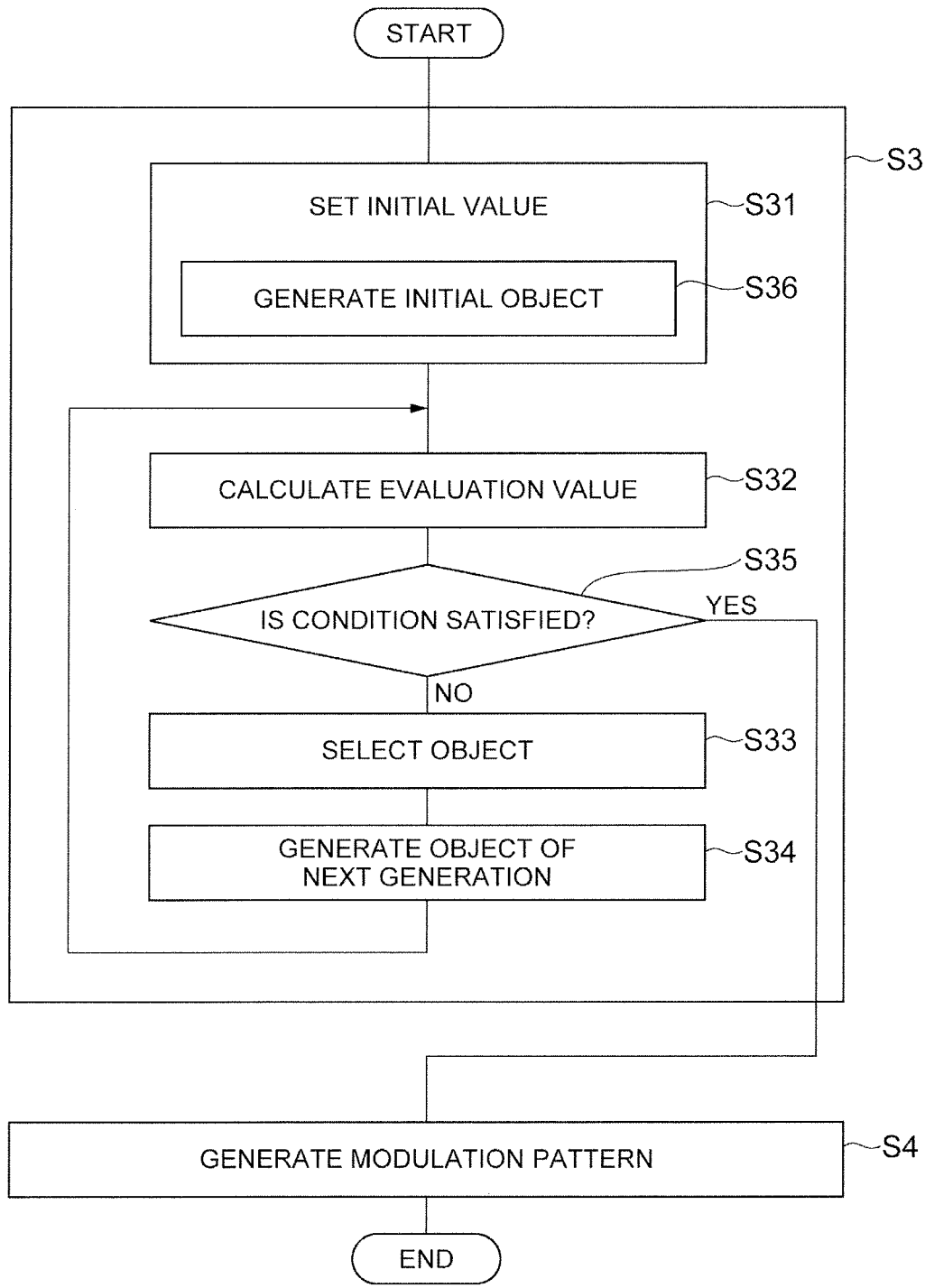
FIG. 21 is a flowchart illustrating a method of designing an intensity spectrum and a phase spectrum (a data generating method) using the modulation pattern calculating device 30.

FIG. 20 is a block diagram illustrating the internal configuration of the spectrum designing unit 32. As illustrated in FIG. 20, the spectrum designing unit 32 includes an initial value setting unit 35, an evaluation value calculating unit 36, an object selecting unit 37, and a next-generation generating unit 38. The initial value setting unit 35 includes an initial object generating unit 39. FIG. 21 is a flowchart illustrating a method of designing an intensity spectrum and a phase spectrum (a data generating method) using the modulation pattern calculating device 30. Hereinafter, the operation of the modulation pattern calculating device 30 according to this embodiment, in other words, a method of designing an intensity spectrum and a phase spectrum (a data generating method) will be described with reference to FIGS. 20 and 21.

First, the spectrum designing unit 32 generates an intensity spectrum function $A(\omega)$ and a phase spectrum function $\Psi(\omega)$ that are appropriate for an optical pulse train on the basis of information relating to the desired optical pulse train input from the arbitrary waveform input unit 31 (a spectrum function generating step S3). In more details, the spectrum function generating step S3 is configured to include an initial value setting step S31, an evaluation value calculating step S32, an object selecting step S33, and a next-generation generating step S34.

In the initial value setting step S31, the initial value setting unit 35 sets M (here, M is an integer equal to or greater than "2") objects (genetic information) $A_1(\omega)$ to $A_M(\omega)$ of the first generation relating to the intensity spectrum function $A(\omega)$ and M objects (genetic information) $\Psi_1(\omega)$ to $\Psi_M(\omega)$ of the first generation relating to the phase spectrum function $\Psi(\omega)$. Each object $A_m(\omega)$ and each object $\Psi_m(\omega)$ (here, m is an integer equal to or greater than "1" and equal to or smaller than M) configure an m-th object pair (pair). In other words, the objects $A_1(\omega)$ to $A_M(\omega)$ and the objects $\Psi_1(\omega)$ to $T_M(\omega)$ configure M object pairs. The objects $A_1(\omega)$ to $A_M(\omega)$ and the objects $\Psi_1(\omega)$ to $\Psi_M(\omega)$ are functions of a frequency $\omega$. Through this initial value setting step S31, M waveform functions (15) of the frequency domain respectively including the objects $A_1(\omega)$ to $A_M(\omega)$ of the first generation of the intensity spectrum function $A(\omega)$ and the objects $\Psi_1(\omega)$ to $\Psi_M(\omega)$ of the first generation of the phase spectrum function $\Psi_0(\omega)$ are defined. Here, i is an imaginary unit.

$$\begin{array}{c} \sqrt{A_1(\omega)}\; \exp\{i\Psi_1(\omega)\} \\ \sqrt{A_2(\omega)}\; \exp\{i\Psi_2(\omega)\} \\ \vdots \\ \sqrt{A_M(\omega)}\; \exp\{i\Psi_M(\omega)\} \end{array} \quad (15)$$

The initial value setting step S31 according to this embodiment includes an initial object generating step S36. In the initial object generating step S36, the initial object generating unit 39 performs a Fourier transform of each of M delta function groups having the same amplitude and the same timing as the amplitude and the timing of each optical pulse included in a desired optical pulse train and having different time phases, thereby generating M object pairs $(A_m(\omega), \Psi_m(\omega))$ (here, m is an integer equal to or greater than "1" and equal to or smaller than M) of the first generation.

Figure 22A:
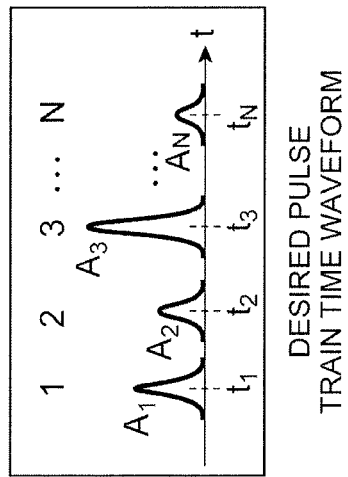
Figure 22B:
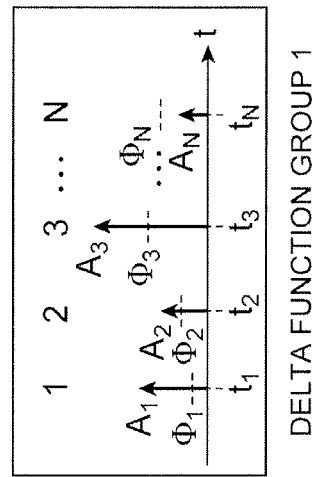
Figure 22C:
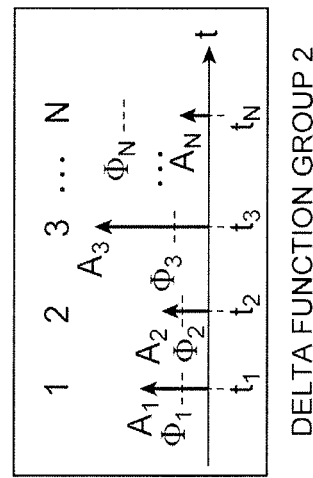
Figure 22D:
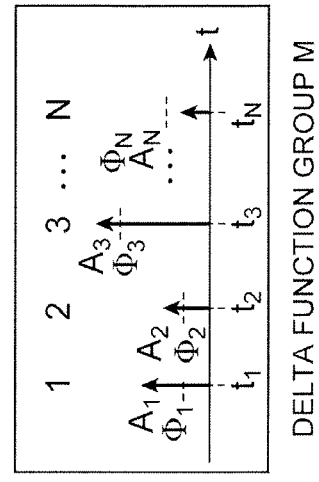
Figure 23:
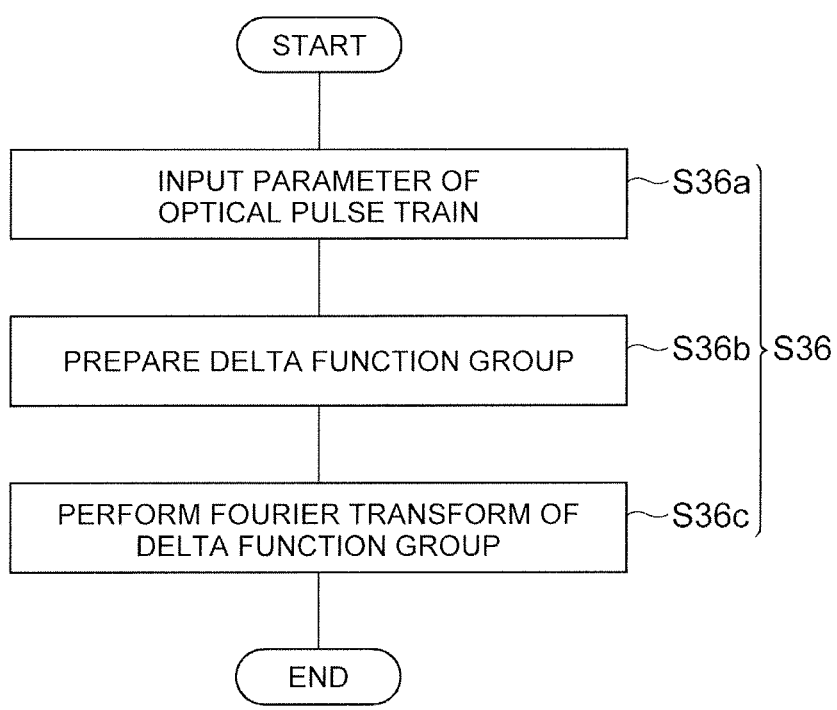
FIG. 23 is a flowchart illustrating details of an initial object generating step S36.

FIGS. 22A, 22B, 22C, and 22D are diagrams conceptually illustrating one example of a method of calculating M object pairs $(A_m(\omega), \Psi_m(\omega))$ (here, m is an integer equal to or greater than "1" and equal to or smaller than M) of the first generation from M delta function groups using the initial object generating unit 39. FIG. 22A illustrates a time waveform of a desired optical pulse train. FIGS. 22B, 22C, and 22D illustrate first, second, and M-th delta function groups. In addition, in an upper part of each part of FIGS. 22A to 22D, numbers (1, 2, . . . , N) of a plurality of optical pulses are illustrated. In the drawing, $t_1, t_2, \ldots, t_N$ are times representing appearance timings of the optical pulses, and $A_1, A_2, \ldots, A_N$ are peak intensities of the optical pulses. FIG. 23 is a flowchart illustrating details of the initial object generating step S36. As illustrated in FIG. 23, the initial object generating step S36 includes Steps S36a to S36c.

In order to realize the time waveform of the desired optical pulse train illustrated in FIG. 22A, the initial object generating unit 39, first, receives an input of parameters of the desired optical pulse train (Step S36a). The parameters of the optical pulse train, for example, are the number N of optical pulses included in the optical pulse train, peak intensities $(A_1, A_2, \ldots, A_N)$ of the optical pulses, appearance timings $(t_1, t_2, \ldots, t_N)$ of the optical pulses, and the like.

Next, the initial object generating step S36 prepares M delta function groups as illustrated in FIGS. 22B to 22D using the parameters relating to the optical pulse train (Step S36b). N optical pulses of each delta function group have the same amplitudes and the same timings as amplitudes and timings of N optical pulses included in the desired optical pulse train. In addition, time phases of N optical pulses of each delta function group are arbitrary and are different from each other. Here, a time phase is a value corresponding to $\Theta k(t)$ of Equation (3) described above. More specifically, as illustrated in FIGS. 22B to 22D, the magnitudes of phases $\Phi_1$ to $\Phi_N$ of delta functions included in the delta function group are set.

Subsequently, the initial object generating unit 39 performs a Fourier transform of each of such delta function groups (Step S36c). In this way, M waveform functions of the frequency domain represented in Equation (15) are acquired, and, as a result, objects $A_1(\omega)$ to $A_M(\omega)$ and $\Psi_1(\omega)$ to $\Psi_M(\omega)$ of the first generation are calculated.

FIGS. 20 and 21 will be referred to again. Next, in the evaluation value calculating step S32, the evaluation value calculating unit 36 normalizes the objects $A_1(\omega)$ to $A_M(\omega)$ of the n-th generation (here, n is an integer that is equal to or greater than "1") such that maximum values thereof are uniform. In one example, the evaluation value calculating unit 36 normalizes the objects $A_1(\omega)$ to $A_M(\omega)$ of the n-th generation such that maximum values thereof become "1." Then, the evaluation value calculating unit 36 may calculate evaluation values on the basis of integral values of the objects $A_1(\omega)$ to $A_M(\omega)$. For example, the evaluation value calculating unit 36 may calculate M evaluation values representing amounts of loss occurring in accordance with intensity spectrum modulation based on the objects $A_1(\omega)$ to $A_M(\omega)$. In such a case, the evaluation value calculating unit 26 may subtract integral values (areas of graphs) $Area_1$ to $Area_M$ of the objects $A_1(\omega)$ to $A_M(\omega)$ after normalization from an area Area of the intensity spectrum function $A(\omega)=h$ taking the uniform value h described above (for example, h=1) for all the frequencies and calculate a value acquired by dividing a resultant value by the area Area (in other words, a value represented in the following Equation (16)) as evaluation values $Loss_1$ to $Loss_M$.

$$\begin{aligned} Loss_1 &= \frac{Area - Area_1}{Area} \\ Loss_2 &= \frac{Area - Area_2}{Area} \\ &\vdots \\ Loss_M &= \frac{Area - Area_M}{Area} \end{aligned} \quad (16)$$

Subsequently, on the basis of M evaluation values (for example, $Loss_1$ to $Loss_M$) calculated in the evaluation value calculating step S32, the object selecting unit 37 selects two or more object pairs $(A_m(\omega), \Psi_m(\omega))$ used for generating M object pairs $(A_m(\omega), \Psi_m(\omega))$ of the (n+1)-th generation among M object pairs $(A_m(\omega), \Psi_m(\omega))$ of the n-th generation (here, m is an integer that is equal to or greater than "1" and is equal to or smaller than M) (an object selecting step S33). In this object selecting step S33, two or more object pairs are selected on the basis of the superiority of the M evaluation values. Here, "on the basis of superiority," for example, means that an object pair group G3 (a first object pair group) formed from at least one object pair $(A_m(\omega), \Psi_m(\omega))$ selected from M object pairs $(A_m(\omega), \Psi_m(\omega))$ of the n-th generation has evaluation values superior to those of all the other object pairs not included in the object pair group G3 among the M object pairs ($A_m(\omega)$, $\Psi_m(\omega)$). Alternatively, it may mean that an average of evaluation values of an object pair group G3 formed from one or more object pairs selected from M object pairs ($A_m(\omega)$, $\Psi_m(\omega)$) of the n-th generation, is superior to an average of evaluation values of the M object pairs ($A_m(\omega)$, $\Psi_m(\omega)$). Hereinafter, this object pair group G3 may be referred to as an "elite object pair group."

In addition, in this embodiment, two or more object pairs ($A_m(\omega)$, $\Psi_m(\omega)$) selected by the object selecting unit 37 in the object selecting step S33 may include an object pair group G4 (a second object pair group) formed from at least one other object pair in addition to the elite object pair group G3. In such a case, an average of evaluation values of the object pair group G4 is inferior to an average of evaluation values of M object pairs ($A_m(\omega)$, $\Psi_m(\omega)$) of the n-th generation (for example, an average of $Loss_1$ to $Loss_M$). Hereinafter, this object pair group G4 may be referred to as a "non-elite object pair group." In a case in which the evaluation values of the M object pairs ($A_m(\omega)$, $\Psi_m(\omega)$) are aligned in order of high to low superiority, evaluation values of the non-elite object pair group G4 are not continuous from evaluation values of the elite object pair group G3. In other words, in the M object pairs ($A_m(\omega)$, $\Psi_m(\omega)$), there are one or more object pairs having evaluation values inferior to an evaluation value that is the most inferior in the elite object pair group G3 and having evaluation values superior to a most superior evaluation value in the non-elite object pair group G4.

Subsequently, in the next-generation generating step S34, the next-generation generating unit 38 generates M object pairs ($A_m(\omega)$, $\Psi_m(\omega)$) (here, m is an integer equal to or greater than "1" and equal to or smaller than M) of the (n+1)-th generation on the basis of the two or more object pairs ($A_m(\omega)$, $\Psi_m(\omega)$) selected by the object selecting unit 37 in the object selecting step S33. Here, "generating a plurality of object pairs of the (n+1)-th generation on the basis of two or more selected object pairs," for example, means a process such as crossing, mutation, and proliferation and means that each of M object pairs ($A_m(\omega)$, $\Psi_m(\omega)$) of the (n+1)-th generation includes at least a part of components of one object pair ($A_m(\omega)$, $\Psi_m(\omega)$) of the n-th generation. In addition, some of the selected two or more object pairs ($A_m(\omega)$, $\Psi_m(\omega)$) (for example, a most superior object pair group) may be directly set as one of object pairs ($A_m(\omega)$, $\Psi_m(\omega)$) (here, m is an integer equal to or greater than "1" and equal to or smaller than M) of the (n+1)-th generation.

In the spectrum function generating step S3, the evaluation value calculating step S32, the object selecting step S33, and the next-generation generating step S34 described above are repeated while 1 is added to n each time until a predetermined condition is satisfied (Step S35). In other words, the evaluation value calculating unit 36, the object selecting unit 37, and the next-generation generating unit 38 repeat the processes while 1 is added to n each time until a predetermined condition is satisfied. Then, the spectrum designing unit 32 (in the spectrum function generating step S3) generates an intensity spectrum function $A(\omega)$ and a phase spectrum function $\Psi(\omega)$ that are appropriate for the form (the number of optical pulses, a peak intensity of each optical pulse, an appearance timing of each optical pulse, and the like) of a desired optical pulse train on the basis of M object pairs ($A_m(\omega)$, $\Psi_m(\omega)$) (here, m is an integer equal to or greater than "1" and equal to or smaller than M) of the n-th generation in a case in which a predetermined condition is satisfied. For example, one object pair ($A_m(\omega)$, $\Psi_m(\omega)$) (here, m is one arbitrary integer) may be extracted from among M object pairs ($A_m(\omega)$, $\Psi_m(\omega)$) (here, m is an integer equal to or greater than "1" and equal to or smaller than M) and set as the intensity spectrum function $A(\omega)$ and the phase spectrum function $\Psi(\omega)$. Here, the predetermined condition, for example, is a case in which the number of iteration trials that is arbitrarily set ends or a case in which an evaluation value that is arbitrarily set is satisfied.

After the processes described above, in the data generating step S2, the modulation pattern generating unit 33 generates data relating to a modulation pattern to be presented to the SLM 14 on the basis of the intensity spectrum function $A(\omega)$ and the phase spectrum function $\Psi(\omega)$ generated in the spectrum function generating step S3. The modulation pattern generating unit 33 provides the generated data for the SLM 14 as a control signal SC2.

Effects acquired by the light control device 1B, the modulation pattern calculating device 30, the modulation pattern calculating method, and the modulation pattern calculating program according to this embodiment described above will be described. In this embodiment, on the basis of superiority of an evaluation value representing the amount of loss occurring in accordance with the intensity spectrum modulation, two or more object pairs ($A_m(\omega)$, $\Psi_m(\omega)$) used for generating M object pairs ($A_m(\omega)$, $T_m(\omega)$) (here, m is an integer equal to or greater than "1" and equal to or smaller than M) of the next generation are selected. Then, on the basis of the two or more selected object pairs ($A_m(\omega)$, $\Psi_m(\omega)$), a plurality of object pairs ($A_m(\omega)$, $T_m(\omega)$) of the (n+1)-th generation are generated. Such processes are repeated while 1 is added to n each time until a predetermined condition is satisfied, and an intensity spectrum function $A(\omega)$ and a phase spectrum function $\Psi(\omega)$ that are appropriate for a desired optical pulse train are generated on the basis of M object pairs ($A_m(\omega)$, $\Psi_m(\omega)$) of the n-th generation of a case in which the predetermined condition is satisfied. Similar to the first embodiment, according to such a system (a genetic algorithm), compared to an iterative Fourier method and a method with a modified iterative Fourier method, a ratio at which the intensity spectrum function $A(\omega)$ and the phase spectrum function $\Psi(\omega)$ are led into a local solution is decreased, and an optimal solution can be retrieved more accurately. In other words, according to this embodiment, while the ratio at which the spectrum functions are led into a local solution is decreased, a spectrum intensity $A(\omega)$ and a spectrum phase $\Psi(\omega)$ for causing a time waveform of the optical pulse train to approach a desired waveform can be calculated. In addition, according to this embodiment, a spectrum intensity $A(\omega)$ and a spectrum phase $\Psi(\omega)$ for minimizing the amount of loss occurring when the optical pulse train is generated can be calculated with high accuracy.

Figure 24A:
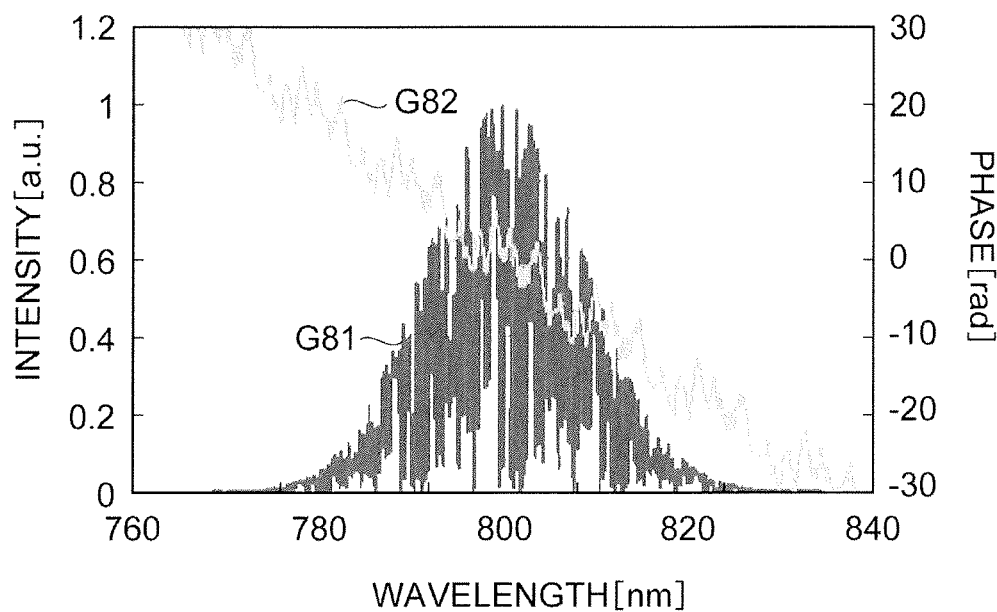
FIG. 24A is a graph illustrating an intensity spectrum function A(ω) and a phase spectrum function Ψ(ω) for generating an optical pulse train formed from 50 optical pulses calculated by a modulation pattern calculating device 30 and a modulation pattern calculating method according to a second embodiment as an example.
Figure 24B:
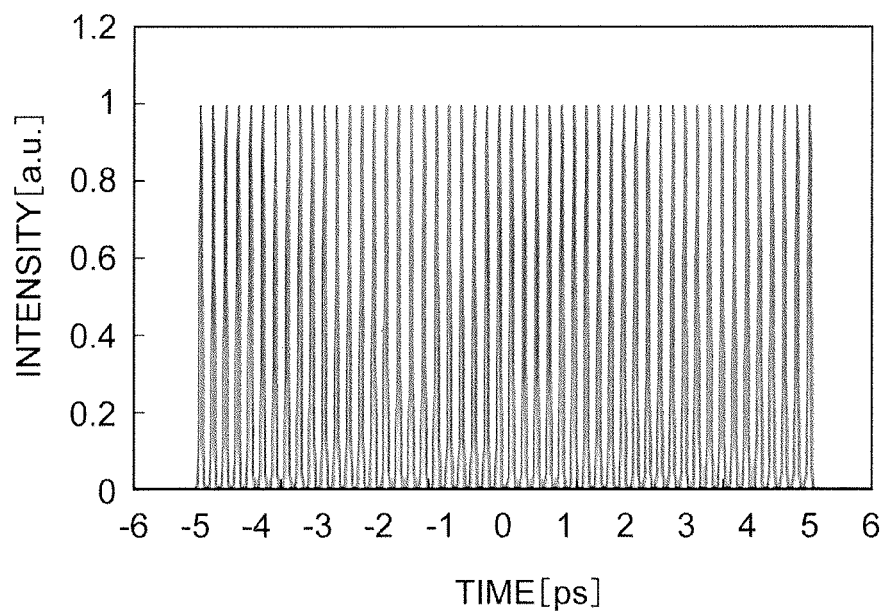
FIG. 24B is a graph illustrating a time-intensity waveform of output light Ld acquired by presenting a modulation pattern based on the intensity spectrum function A(ω) and a phase spectrum function Ψ(ω) illustrated in FIG. 24A to the SLM 14.

FIG. 24A is a graph illustrating an intensity spectrum function $A(\omega)$ and a phase spectrum function $\Psi(\omega)$ for generating an optical pulse train formed from 50 optical pulses calculated using the modulation pattern calculating device 30 and the modulation pattern calculating method according to this embodiment as one example. A graph G81 illustrates the intensity spectrum function $A(\omega)$. A graph G82 illustrates the phase spectrum function $\Psi(\omega)$. FIG. 24B is a graph illustrating a time intensity waveform of output light Ld acquired by presenting a modulation pattern based on the intensity spectrum function $A(\omega)$ and the phase spectrum function $\Psi(\omega)$ illustrated in FIG. 24A to the SLM 14. By referring to FIG. 24B, in a case in which an intensity spectrum function $A(\omega)$ and a phase spectrum function $\Psi(\omega)$ are calculated using the modulation pattern calculating device 30 and the modulation pattern calculating method according to this embodiment, it can be understood that variations in the peak intensity of 50 optical pulses are inhibited to be small in the time intensity waveform of generated output light Ld.

In addition, conventionally, when an optical pulse train having a desired form (the number of optical pulses, a peak intensity of each optical pulse, an appearance timing of each optical pulse, and the like) is realized using an SLM, in order to calculate an intensity spectrum function $A(\omega)$ and a phase spectrum function $\Psi(\omega)$ having a low loss, a method for comprehensively retrieving an optimal combination of a time-intensity waveform function and a time-phase function of an optical pulse train is used. However, when an optical pulse train is tried to be generated using such a method, it has been seen that the amount of calculation exponentially increases in accordance with an increase in the number of optical pulses, and the number of optical pulses is substantially limited due to restrictions of computation capability and computation times of a computer and the like. In contrast to this, according to the system of this embodiment, the number of object pairs $(A_m(\omega), \Psi_m(\omega))$ of each generation is limited to M, and an increase in the amount of calculation according to an increase in the number of optical pulses is small. Therefore, according to this embodiment, an intensity spectrum function $A(\omega)$ and a phase spectrum function $\Psi(\omega)$ for realizing an optical pulse train having a desired form can be designed without depending on the number of optical pulses.

Figure 25:
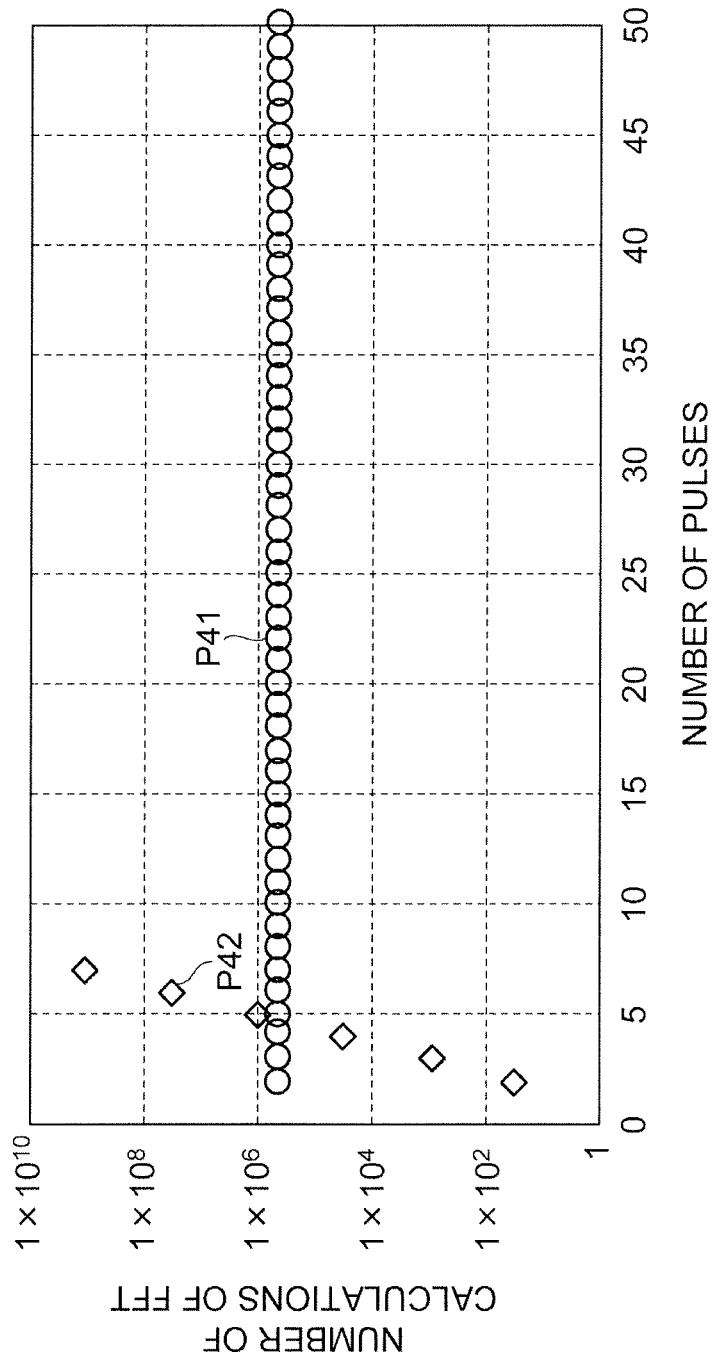
FIG. 25 is a graph comparing the number of calculations of fast Fourier transforms (FFT) required in a conventional system comprehensively searching for an optimal combination of a time-intensity waveform function and a time-phase function of an optical pulse train with the number of calculations of FFTs required in this embodiment.

FIG. 25 represent graphs for comparing the number of times of calculation of a fast Fourier transform (FFT) required for a conventional system comprehensively retrieving an optimal combination of a time-intensity waveform function and a time-phase function of an optical pulse train with the number of times of calculation of a FFT required in this embodiment. The vertical axis represents the number of times of calculation of an FFT, and the horizontal axis represents the number of optical pulses. A circular plot P41 represents the system of this embodiment, and a rhombic plot P42 represents a conventional system. As illustrated in FIG. 25, in the conventional system, the number of times of performing an FFT exponentially increases in accordance with an increase in the number of optical pulses. In contrast to this, in the system of this embodiment, the number of times of performing an FFT does not mostly depend on the number of pulses. This represents that the system of this embodiment can calculate a modulation pattern for a desired optical pulse train without having a restriction of the number of optical pulses.

Figure 26:
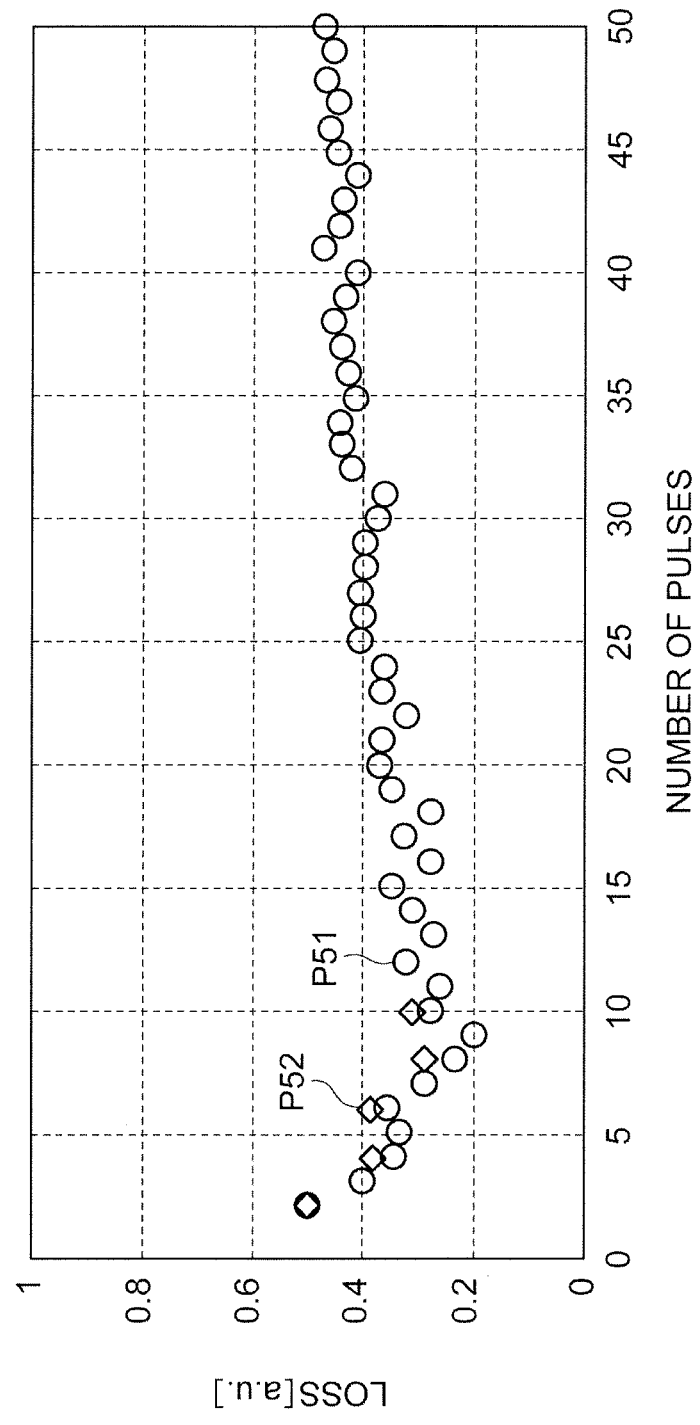
FIG. 26 is a graph comparing the amount of loss according to an intensity spectrum modulation pattern calculated using a conventional system with the amount of loss according to an intensity spectrum modulation pattern calculated using the system according to this embodiment.

FIG. 26 represents graphs for comparing the amount of loss according to an intensity spectrum modulation pattern calculated using a conventional system with the amount of loss according to an intensity spectrum modulation pattern calculated using the system of this embodiment. The vertical axis represents the amount of loss (in an arbitrary unit), and the horizontal axis represents the number of optical pulses. In addition, a circular plot P51 illustrates the system of this embodiment, and a rhombic plot P52 illustrates a conventional system. In the conventional system, when the number of pulses exceeds 10, the amount of calculation becomes enormous, and the calculation cannot be performed, and thus results for 10 pulses or less are illustrated. By referring to FIG. 26, it can be understood that, according to the system of this embodiment, the amount of loss is lower than that according to a conventional system for any number of pulses. In other words, according to this embodiment, a modulation pattern having low loss can be generated while the amount of calculation is inhibited to be small.

In addition, as in this embodiment, two or more object pairs $(A_m(\omega), \Psi_m(\omega))$ selected by the object selecting unit 37 (the object selecting step S33) may include the object pair group G3 formed from at least one object pair $(A_m(\omega), \Psi_m(\omega))$ and the object pair group G4 formed from at least one other object pair $(A_m(\omega), \Psi_m(\omega))$. In addition, an average of evaluation values of the object pair group G3 may be superior to an average of evaluation values of M object pairs $(A_m(\omega), \Psi_m(\omega))$ of the n-th generation, and an average of evaluation values of the object pair group G4 may be inferior to the average of the evaluation values of M object pairs $(A_m(\omega), \Psi_m(\omega))$ of the n-th generation.

Figure 27:
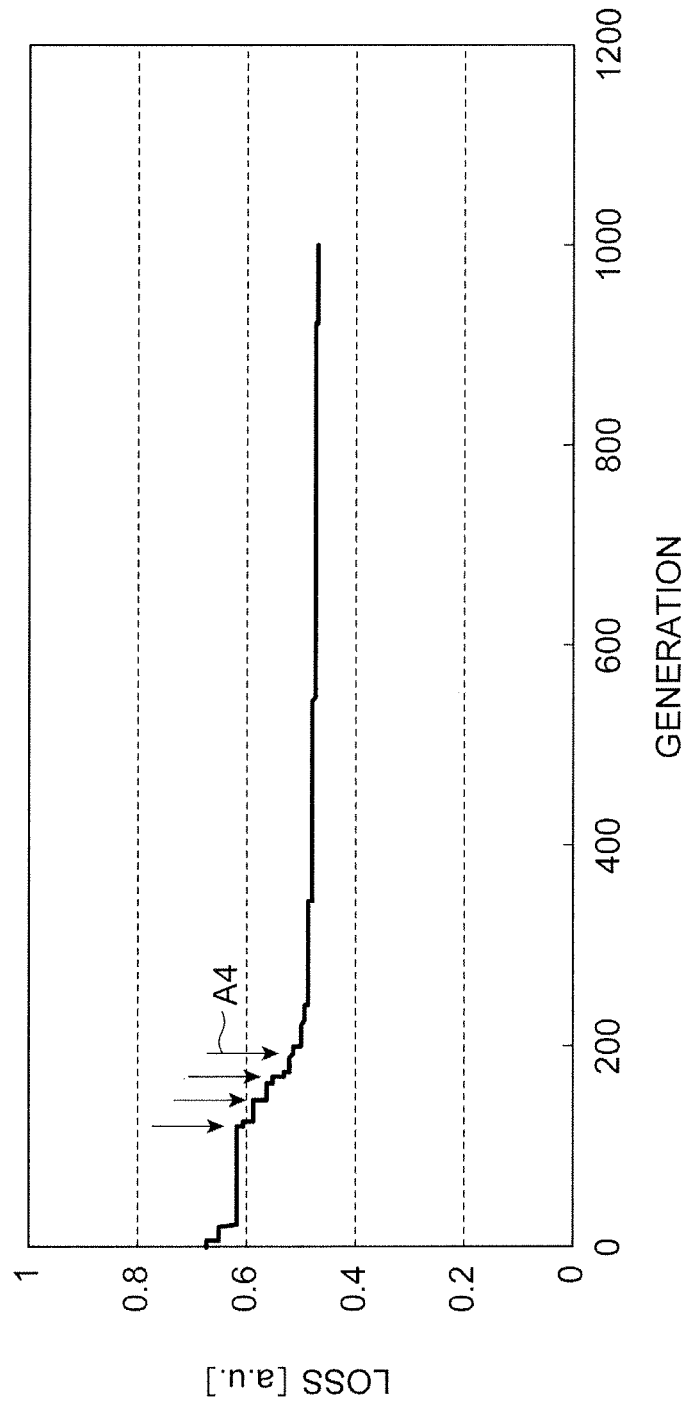
FIG. 27 is a graph illustrating an appearance in which an evaluation value changes in accordance with transition of the generation in a case in which an intensity spectrum function A(ω) and a phase spectrum function Ψ(ω) (see FIG. 24A) for generating an optical pulse train of 50 pulses are calculated.

Similar to the first embodiment, also in this embodiment, two or more object pairs $(A_m(\omega), \Psi_m(\omega))$ selected by the object selecting unit 37 (the object selecting step S33) include an object pair group G4 formed from non-elite object pairs. FIG. 27 is a graph illustrating an appearance of changes in the evaluation value according to transition of the generation in a case in which an intensity spectrum function $A(c)$) and a phase spectrum function $\Psi(\omega)$ (see FIG. 24A) for generating an optical pulse train of 50 pulses are calculated. In FIG. 27, the horizontal axis represents a generation, and the vertical axis represents an evaluation value (the amount of loss according to intensity spectrum modulation). In the example illustrated in FIG. 27, while the evaluation value once converges in the vicinity of about 40th generation, by introducing a non-elite object pair in the vicinity of about 100th generation (denoted using an arrow A4 in the drawing), the evaluation value discontinuously decreases (is enhanced). Then, every time when a non-elite object pair is introduced thereafter, the evaluation value discontinuously further decreases (is enhanced). In this way, by introducing non-elite object pair to two or more object pairs $(A_m(\omega), \Psi_m(\omega))$ selected by the object selecting unit 37 (the object selecting step S33), the evaluation value comes out from a value at which the evaluation values once converges and can be further enhanced.

In addition, according to the light control device 1B of this embodiment, by including the modulation pattern calculating device 30, a spectrum intensity $A(\omega)$ and a spectrum phase $\Psi(\omega)$ are calculated while the ratio being led into a local solution is decreased, and the time waveform of the output light Ld can approach the time waveform of a desired optical pulse train. Furthermore, according to the light control device 1B of this embodiment, a spectrum intensity $A(\omega)$ and a spectrum phase $\Psi(\omega)$ for minimizing the amount of loss occurring when an optical pulse train is generated can be calculated with high accuracy.

In addition, in this embodiment, although the number of object pairs of each generation is uniformized as M, the number of object pairs of each generation may be changed.

Third Embodiment

The modulation pattern calculating device 20, the modulation pattern calculating method, and the modulation pattern calculating program according to the embodiment described above are not limited to be used for the design of an intensity spectrum modulation pattern (one-dimensional pattern) represented by time-pulse shaping and, for example, may be used also for designing a two-dimensional intensity modulation pattern represented by beam-intensity distribution shaping. In other words, for example, they may be used also for designing an intensity distribution of a pattern such as a hologram present in an area having a relation of an optical Fourier transform with a desired intensity pattern.

Figure 28:
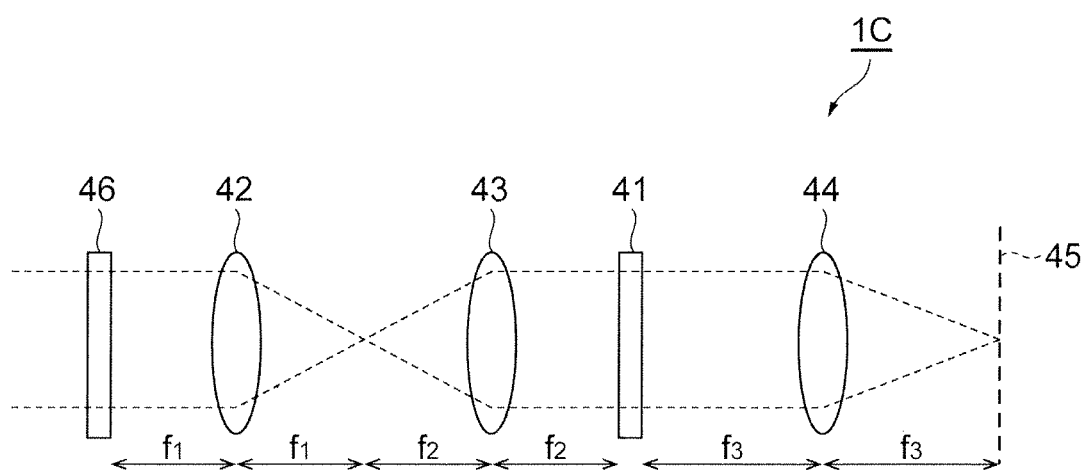
FIG. 28 is a diagram schematically illustrating the configuration of a light control device 1C according to a third embodiment.

FIG. 28 is a diagram schematically illustrating the configuration of a light control device 1C according to a third embodiment when a two-dimensional intensity modulation pattern is effectively used. In FIG. 28, a modulation pattern calculating device 20 (or 30) included in the light control device 1C is not illustrated. A light source may be a pulse light source like the light source 2 according to each embodiment described above or a continuous wave (CW) laser light source. As an application of each embodiment described above, the light control device 1C displays a desired light intensity distribution on a screen 45. The light control device 1C includes two SLMs 41 and 46, one pair of lenses 42 and 43, and a Fourier transform lens 44. The two SLMs 41 and 46 are optically coupled through the one pair of lenses 42 and 43. An optical distance between the SLM 46 and the lens 42 is a focal distance $f_1$ of the lens 42, and an optical distance between the SLM 41 and the lens 43 is a focal distance $f_2$ of the lens 43. In one example, the focal distance $f_1$ and the focal distance $f_2$ are the same. An optical distance between the lens 42 and the lens 43 is a sum of the focal distance $f_1$ and the focal distance $f_2$. The Fourier transform lens 44 is optically coupled with the SLM 41, and an optical distance therebetween is a focal distance $f_3$ of the Fourier transform lens 44. This light control device 1C forms an output light image on a screen 45 that is separate from the Fourier transform lens 44 by the focal distance $f_3$ to a side opposite to the SLM 41. The SLM 46 is an SLM for two-dimensional intensity modulation and presents a modulation pattern for intensity modulation provided from the modulation pattern calculating device 20 (or 30). The SLM 41 is an SLM for two-dimensional phase modulation and presents a modulation pattern for phase modulation provided from the modulation pattern calculating device 20 (or 30). The SLM 46 displaying a hologram pattern for intensity modulation and the SLM 41 displaying a hologram pattern for phase modulation may be interchanged.

The data generating device, the light control device, the data generating method, and the data generating program according to the present invention are not limited to the embodiments described above and may be variously changed. For example, in the first embodiment described above, although the initial value setting unit includes the initial object generating unit, and the initial object generating unit generates a plurality of objects of the first generation using the iterative Fourier method, the method of determining a plurality of objects of the first generation is not limited thereto, and, for example, a plurality of arbitrary objects may be input. In addition, in the first embodiment described above, although the evaluation value calculating unit calculates an evaluation value representing a degree of difference between the time-intensity waveform function of the second waveform function and a function acquired by multiplying the function representing a desired time-phase waveform by a coefficient (Equation (14)), the method of calculating an evaluation value is not limited thereto, and an arbitrary calculation equation may be used as long as it represents a degree of difference between the time-intensity waveform function of the second waveform function and a desired time intensity waveform.

What is claimed is:

1. A data generating device generating data for controlling a spatial light modulator, the data generating device comprising a processor, the processor configured to:
    generate an intensity spectrum function $A(\omega)$ appropriate for a desired time-intensity waveform;
    generate data on the basis of a phase spectrum function $\Psi(\omega)$ and the generated intensity spectrum function $A(\omega)$;
    set a plurality of objects of a first generation of the intensity spectrum function $A(\omega)$ and the phase spectrum function $\Psi(\omega)$;
    transform a plurality of first waveform functions of a frequency domain including a plurality of objects of an n-th generation (here, n is an integer equal to or greater than "1") and the phase spectrum function $\Psi(\omega)$ into a plurality of second waveform functions of a time domain each including a time-intensity waveform function and a time-phase waveform function;
    calculate an evaluation value representing a degree of difference between the time-intensity waveform function and the desired time-intensity waveform for each of the second waveform functions;
    select two or more objects used for generating a plurality of objects of an (n+1)-th generation among a plurality of objects of the n-th generation on the basis of superiority of the evaluation value;
    generate a plurality of objects of the (n+1)-th generation on the basis of the selected two or more objects, wherein transforming the plurality of first waveform functions of the frequency domain into the plurality of second waveform functions of the time domain; calculating the evaluation value; selecting two or more objects; and generating the plurality of objects of the (n+1)-th generation repeat while adding 1 to n until a predetermined condition is satisfied; and
    generate an intensity spectrum function $A(\omega)$ appropriate for the desired time-intensity waveform from a plurality of objects of the n-th generation of a case in which the predetermined condition is satisfied.

2. The data generating device according to claim 1, wherein setting the plurality of objects of the first generation of the intensity spectrum function $A(\omega)$ and the phase spectrum function $\Psi(\omega)$ includes the processor configured to:
    generate the plurality of objects of the first generation; and
    generate an intensity spectrum function $A_{IFTA}(\omega)$ by repeatedly performing a Fourier transform of a third waveform function of the frequency domain including the intensity spectrum function $A(\omega)$ and the phase spectrum function $\Psi(\omega)$, a first substitution of a time-intensity waveform function based on the desired time-intensity waveform in the time domain after the Fourier transform, an inverse Fourier transform executed after the first substitution, and a second substitution for restricting the phase spectrum function $\Psi(\omega)$ in the frequency domain after the inverse Fourier transform and generate the plurality of objects of the first generation by changing the intensity spectrum function $A_{IFTA}(\omega)$.

3. The data generating device according to claim 1, wherein transforming the plurality of first waveform functions of the frequency domain into the plurality of second waveform functions of the time domain; and calculating the evaluation value includes the processor configured to:
    calculate the evaluation value representing a degree of difference between the time-intensity waveform function and a function acquired by multiplying a function representing the desired time-phase waveform by a coefficient for each of the second waveform functions, and wherein the coefficient has a value for which the evaluation value after the multiplication is superior to the evaluation value before the multiplication using the coefficient.

4. The data generating device according to claim 1,
wherein the selected two or more objects include a first object group formed from at least one object and a second object group formed from at least one other object,
wherein an average of the evaluation values of the first object group is superior to an average of the evaluation values of a plurality of objects of the n-th generation, and
wherein an average of the evaluation values of the second object group is inferior to an average of the evaluation values of the plurality of objects of the n-th generation.

5. A light control device comprising:
a light source configured to output input light;
a spectroscopic element configured to spectrally diffract the input light;
a spatial light modulator configured to modulate an intensity spectrum of the input light after the spectral diffraction and output modulated light; and
an optical system configured to condense the modulated light,
wherein the spatial light modulator modulates an intensity spectrum of the input light on the basis of the data generated by the data generating device according to claim 1.

6. A data generating device generating data for controlling a spatial light modulator, the device comprising a processor, the processor configured to:
generate an intensity spectrum function $A(\omega)$ and a phase spectrum function $\Psi(\omega)$ for an optical pulse train including a plurality of optical pulses aligned with a time interval left therebetween; and
generate data on the basis of the generated intensity spectrum function $A(\omega)$ and the generated phase spectrum function $\Psi(\omega)$;
set a plurality of object pairs of a first generation relating to the intensity spectrum function $A(\omega)$ and the phase spectrum function $\Psi(\omega)$;
calculate an evaluation value representing an amount of loss occurring due to intensity spectrum modulation based on a plurality of objects of an n-th generation (here, n is an integer that is equal to or greater than "1") of the intensity spectrum function $A(\omega)$ for each object pair;
select two or more object pairs used for generating a plurality of object pairs of an (n+1)-th generation among a plurality of object pairs of the n-th generation on the basis of superiority of the evaluation value;
generate a plurality of object pairs of the (n+1)-th generation on the basis of the selected two or more object pairs, wherein calculating the evaluation value; selecting two or more object pairs; and generating the plurality of object pairs repeat while adding 1 to n until a predetermined condition is satisfied; and
generate the intensity spectrum function $A(\omega)$ and the phase spectrum function $\Psi(\omega)$ for generating the optical pulse train from a plurality of object pairs of an n-th generation of a case in which a predetermined condition is satisfied.

7. The data generating device according to claim 6,
wherein setting the plurality of object pairs of the first generation relating to the intensity spectrum function $A(\omega)$ and the phase spectrum function $\Psi(\omega)$ includes the processor configured to:
generate the plurality of objects of the first generation; and
generate the plurality of objects of the first generation by performing a Fourier transform of a plurality of delta functions having the same amplitude and the same timing as an amplitude and a timing of each optical pulse included in the optical pulse train and having different time phases.

8. The data generating device according to claim 6,
wherein calculating the evaluation value representing the amount of loss occurring due to intensity spectrum modulation based on the plurality of objects of the n-th generation (here, n is the integer that is equal to or greater than "1") of the intensity spectrum function $A(\omega)$ for each object pair includes the processor configure to:
normalize a plurality of objects of an n-th generation relating to the intensity spectrum function $A(\omega)$ such that maximum values are uniform; and
calculate the evaluation value on the basis of an integral value of each of the plurality of objects after the normalization.

9. The data generating device according to claim 6,
wherein the selected two or more object pairs include a first object pair group formed from at least one object pair and a second object pair group formed from at least one other object pair,
wherein an average of the evaluation values of the first object pair group is superior to an average of the evaluation values of a plurality of object pairs of the n-th generation, and
wherein an average of the evaluation values of the second object pair group is inferior to the average of the evaluation values of the plurality of object pairs of the n-th generation.

10. A light control device comprising:
a light source configured to output input light;
a spectroscopic element configured to spectrally diffract the input light;
a spatial light modulator configured to modulate the input light after the spectral diffraction and output modulated light; and
an optical system configured to condense the modulated light,
wherein the spatial light modulator modulates the input light on the basis of the data generated by the data generating device according to claim 6.

11. A method of generating data for controlling a spatial light modulator, the method comprising:
generating an intensity spectrum function $A(\omega)$ appropriate for a desired time-intensity waveform; and
generating the data on the basis of a phase spectrum function $\Psi(\omega)$ and the intensity spectrum function $A(\omega)$,
wherein generating of the intensity spectrum function includes:
setting a plurality of objects of a first generation of the intensity spectrum function $A(\omega)$ and the phase spectrum function $\Psi(\omega)$;
transforming a plurality of first waveform functions of a frequency domain including a plurality of objects of an n-th generation (here, n is an integer equal to or greater than "1") and the phase spectrum function $\Psi(\omega)$ into a plurality of second waveform functions of a time domain each including a time-intensity waveform function and a time-phase waveform function and calculating an evaluation value representing a degree of difference between the time-intensity waveform function and the desired time-intensity waveform for each of the second waveform functions;

selecting two or more objects used for generating a plurality of objects of an (n+1)-th generation among a plurality of objects of the n-th generation on the basis of the evaluation value; and generating a plurality of objects of the (n+1)-th generation on the basis of the two or more objects, and wherein calculating of the evaluation value, selecting of the objects, and generating of the objects are repeated while adding 1 to n until a predetermined condition is satisfied, and, in generating of the intensity spectrum function, an intensity spectrum function $A(\omega)$ that is appropriate for the desired time-intensity waveform is generated from a plurality of objects of the n-th generation of a case in which the predetermined condition is satisfied.

12. A method of generating data for controlling a spatial light modulator, the method comprising:

generating an intensity spectrum function $A(\omega)$ and a phase spectrum function $\Psi(\omega)$ appropriate for an optical pulse train including a plurality of optical pulses aligned with a time interval left therebetween; and generating the data on the basis of the intensity spectrum function $A(\omega)$ and the phase spectrum function $\Psi(\omega)$, wherein generating of the spectrum function includes:

setting a plurality of object pairs of a first generation relating to the intensity spectrum function $A(\omega)$ and the phase spectrum function $\Psi(\omega)$;

calculating an evaluation value representing an amount of loss occurring due to intensity spectrum modulation based on a plurality of objects of an n-th generation (here, n is an integer that is equal to or greater than "1") of the intensity spectrum function $A(\omega)$ for each object pair;

selecting two or more object pairs used for generating a plurality of object pairs of an (n+1)-th generation among a plurality of object pairs of the n-th generation on the basis of superiority of the evaluation value; and generating a plurality of object pairs of the (n+1)-th generation on the basis of the two or more object pairs, wherein calculating of the evaluation value, selecting of the object pairs, and generating of the object pairs are repeated while adding 1 to n until a predetermined condition is satisfied, and, in generating of the spectrum function, the intensity spectrum function $A(\omega)$ and the phase spectrum function $\Psi(\omega)$ that are appropriate for the optical pulse train are generated from a plurality of object pairs of an n-th generation of a case in which the evaluation value satisfies a predetermined condition.

13. A non-transitory computer-readable storage medium including computer-readable instructions that, when executed by a computer, cause the computer to execute the data generating method according to claim 11.

14. A non-transitory computer-readable storage medium including computer-readable instructions that, when executed by a computer, cause the computer to execute the data generating method according to claim 12.

15. A data generating device generating data for controlling a spatial light modulator, the data generating device comprising circuitry configured to:

generate an intensity spectrum function $A(\omega)$ appropriate for a desired time-intensity waveform;

generate the data on the basis of a phase spectrum function $\Psi(\omega)$ and the intensity spectrum function $A(\omega)$ generated;

set a plurality of objects of a first generation of the intensity spectrum function $A(\omega)$ and the phase spectrum function $\Psi(\omega)$;

transform a plurality of first waveform functions of a frequency domain including a plurality of objects of an n-th generation (here, n is an integer equal to or greater than "1") and the phase spectrum function $\Psi(\omega)$ into a plurality of second waveform functions of a time domain each including a time-intensity waveform function and a time-phase waveform function and calculate an evaluation value representing a degree of difference between the time-intensity waveform function and the desired time-intensity waveform for each of the second waveform functions;

select two or more objects used for generating a plurality of objects of an (n+1)-th generation among a plurality of objects of the n-th generation on the basis of superiority of the evaluation value; and generate a plurality of objects of the (n+1)-th generation on the basis of the two or more objects, and wherein the circuitry repeats calculation of the evaluation value, selecting of the objects, and generating of the objects while adding 1 to n until a predetermined condition is satisfied, and in designing of the intensity spectrum, generates an intensity spectrum function $A(\omega)$ appropriate for the desired time-intensity waveform from a plurality of objects of the n-th generation of a case in which the predetermined condition is satisfied.

16. A data generating device generating data for controlling a spatial light modulator, the device comprising circuitry configured to:

generate an intensity spectrum function $A(\omega)$ and a phase spectrum function $\Psi(\omega)$ for an optical pulse train including a plurality of optical pulses aligned with a time interval left therebetween;

generate the data on the basis of the intensity spectrum function $A(\omega)$ and the phase spectrum function $\Psi(\omega)$;

set a plurality of object pairs of a first generation relating to the intensity spectrum function $A(\omega)$ and the phase spectrum function $\Psi(\omega)$;

calculate an evaluation value representing an amount of loss occurring due to intensity spectrum modulation based on a plurality of objects of an n-th generation (here, n is an integer that is equal to or greater than "1") of the intensity spectrum function $A(\omega)$ for each object pair;

select two or more object pairs used for generating a plurality of object pairs of an (n+1)-th generation among a plurality of object pairs of the n-th generation on the basis of superiority of the evaluation value; and generate a plurality of object pairs of the (n+1)-th generation on the basis of the two or more object pairs, wherein the circuitry repeats calculation of the evaluation value, selecting of the object pairs, and generating of the object pairs while adding 1 to n until a predetermined condition is satisfied, and in designing of the intensity spectrum, generates the intensity spectrum function $A(\omega)$ and the phase spectrum function $\Psi(\omega)$ for generating the optical pulse train from a plurality of object pairs of an n-th generation of a case in which a predetermined condition is satisfied.

* * * * *